(12) United States Patent
Keswick

(10) Patent No.: US 7,627,838 B2
(45) Date of Patent: Dec. 1, 2009

(54) AUTOMATED INTEGRATED CIRCUIT DEVELOPMENT

(75) Inventor: Paul D. Keswick, Morgan Hill, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 409 days.

(21) Appl. No.: 11/411,258

(22) Filed: Apr. 25, 2006

(65) Prior Publication Data

US 2007/0250800 A1 Oct. 25, 2007

(51) Int. Cl.
*G06F 17/50* (2006.01)
*G06F 9/45* (2006.01)
*H03K 17/693* (2006.01)
*H03K 19/00* (2006.01)

(52) U.S. Cl. .............. 716/2; 716/3; 716/16; 716/17; 716/18

(58) Field of Classification Search ............. 716/16–18, 716/2–3
See application file for complete search history.

(56) References Cited

U.S. PATENT DOCUMENTS

| | | | |
|---|---|---|---|
| 2004/0128626 A1* | 7/2004 | Wingren et al. | 716/1 |
| 2004/0181770 A1* | 9/2004 | Zhang | 716/19 |
| 2004/0230936 A1* | 11/2004 | Cobb et al. | 716/19 |
| 2004/0237059 A1* | 11/2004 | Chen et al. | 716/10 |
| 2006/0271899 A1* | 11/2006 | Tan et al. | 716/13 |

\* cited by examiner

*Primary Examiner*—Jack Chiang
*Assistant Examiner*—Suresh Memula

(57) ABSTRACT

Customization methodology for integrated circuit (e.g., clocks) design customization using a software tool that integrates multiple integrated circuit development operations.

13 Claims, 18 Drawing Sheets

AUTOMATED INTEGRATED CIRCUIT DEVELOPMENT

TECHNICAL FIELD

This invention relates to the field of integrated circuits and, in particular, to an automated methodology for integrated circuit development.

BACKGROUND

Conventional integrated circuit (IC) design is a resource-intensive and time-consuming process. Customization is one technique to streamline integrated circuit design. Customization refers to altering a standard base die design to enable particular base die functions. The base die typically includes all of the major resources to implement a particular function. The metal layers and vias connecting pads on the base die and core circuitry of the base die can be altered (i.e., customized) to provide certain input and output functions on the package pins.

Conventional integrated circuit design, including customization, is performed manually by a team of engineers. Unfortunately, the manual design of integrated circuits is very time consuming. FIG. 1 illustrates a conventional chip design process. The conventional chip design process may be divided into two phases: one phase generally occurs at the customer site, and another phase typically occurs at one or more design and testing sites. At the customer site, a field application engineer (FAE) meets with the customer to determine the customer's chip requirements. The field application engineer works with the customer to develop an initial pin layout. The initial pin layout is often dictated by the customer. However, the initial pin layout is subject to change, and often changes, due to later verification and validation operations which may determine that the initial pin layout fails to meet functional objectives or fails to comply with physical bonding rules.

After the customer and field application engineer develop the initial pin layout, the field engineer takes the initial pin layout to the design site. At the design site, the design engineer analyzes the initial pin layout to determine if the initial pin layout is a viable pin layout. If it is not, then the field application engineer resumes communication with the customer to propose another pin layout. Depending on the success in defining a pin layout that works for the customer and is viable for production, the field application engineer and customer may have to repeat this process several times to refine the customer's requirements and redesign the pin layout.

After a viable pin layout is identified, the design engineer designs the core circuitry of the IC which connects to the input/output (I/O) pin layout. The design engineer may use various electronic design automation (EDA) tools for circuit design, simulation, verification, logic synthesis, and placement and routing. Exemplary EDA tools are commercially available from companies such as Cadence, Synopsys, Mentor Graphics and Magma Design Automation. In one design methodology, a first step in the design of core circuitry of an integrated circuit is to convert the user specification into an abstract form of the desired circuit, for example, a register transfer level (RTL) description of the design. The RTL of the integrated circuit is assigned to core regions of the die and connected to the pin layout. The design engineer then performs logic synthesis in which the RTL is turned into a design implementation in terms of a gate level netlist. An EDA tool used by design engineers may illustrate input and output ports of a component, cell, or instance (also referred to as gates) with "pins" on their sides. These internal pins of various "gates" are connected together using interconnect traces. A net may be defined as a collection of electrically connected gate pins. As such, a list of the nets that specify the electrical interconnections between internal pins in an integrated circuit is referred to as a "netlist." It should be noted that such "pins" interconnecting the internal components, or instances, on the die are to be distinguished from the external pins of a packaged device.

The next step in the integrated circuit design is the layout. The integrated circuit layout may be generated using the netlist or another description of the integrated circuit such as schematics, text files, hardware description languages, and so forth. For example, in a process referred to as placement and routing, a design engineer uses a netlist to produce the placement layout of the IC design. In placement, the gates in the netlist are assigned to non-overlapping locations on the die area. In routing, the wires (i.e., interconnect traces) that connect the gates in the netlist are added. The design engineer may perform layout verification using a technique referred to as design rule checking (DRC). If the layout violates design rules, then the designed IC may not function. The layout of the IC may be generated in a GDSII format (a database format which is commonly used in the IC industry for IC layout data exchange) and input to DRC software which generates a report of design rule violations. The GDSII files also may be used as the output of the IC design cycle that is provided to a foundry for fabrication of the IC.

At this stage in the design, the design engineer also may generate a schematic of the chip design. The design engineer also typically performs simulation and/or verification (e.g., timing and functional) to determine whether the IC design performs as intended using simulation tools, synthesis tools, and verification tools. Verification may also be referred to as a "Test Bench" which contains the descriptions of circuit stimuli and corresponding outputs which verify the behavior of the design over time. Script files may be generated by the design engineer to perform verification, for example, to run a static timing analysis (STA) of the designed IC, which may be performed to determine the expected timing of an IC without requiring simulation. While such timing measurements can be performed using circuit simulation, such an approach may be too slow to be practical.

The integrated circuit layout is then converted into mask layers (e.g., using GDSII files) for fabrication of wafers containing one or more of the designed integrated circuit dies. The integrated circuit dies then may be assembled into packaged components for prototype or commercial units. Once initial prototypes are built, the design engineer quickly performs measurements on the prototype to compare the prototypes' performance against expected results from their simulation tools. After prototypes have been tested, an engineer (e.g., the design engineer or a product engineer) conducts what is referred to as characterization to test the outer limits of the design to establish and/or verify the operational specifications for the design. A test engineer typically may generate the testing (e.g., wafer sorting) and characterization programs and hardware boards that are connected to a test system and used to test a particular IC die design. The test engineer also typically generates a schematic of the characterization and wafer hardware board in order to have such a board constructed to test the integrated circuit dies. An application engineer eventually generates a datasheet such as an I/O buffer information specification (IBIS) to describe the package parasitics and other package information. Any errors or mismatches identified by the design, test, and application engineers may be fixed through collaboration among the various engineers.

Although other conventional chip design processes may differ from the illustrated chip design process, the depicted chip design process is representative of the time and resources that are involved in producing a chip design and samples for a customer. Currently, in some types of chip development, a customer may expect a turnaround cycle time of about 10-15 weeks to produce samples. Additionally, chip design companies are limited in the number of chips that are produced because of the time and resource costs expended for each chip design. In other words, the repetitive design process in which a customer designs and redesigns an integrated circuit to accommodate the design guidelines imposed by the customer specification can delay the time in which a customer obtains commercial units of the integrated circuit and can limit the chip designers in their ability to produce more integrated circuit designs.

BRIEF DESCRIPTION OF THE DRAWINGS

The present invention is illustrated by way of example, and not by way of limitation, in the figures of the accompanying drawings.

DETAILED DESCRIPTION

Figure 1:
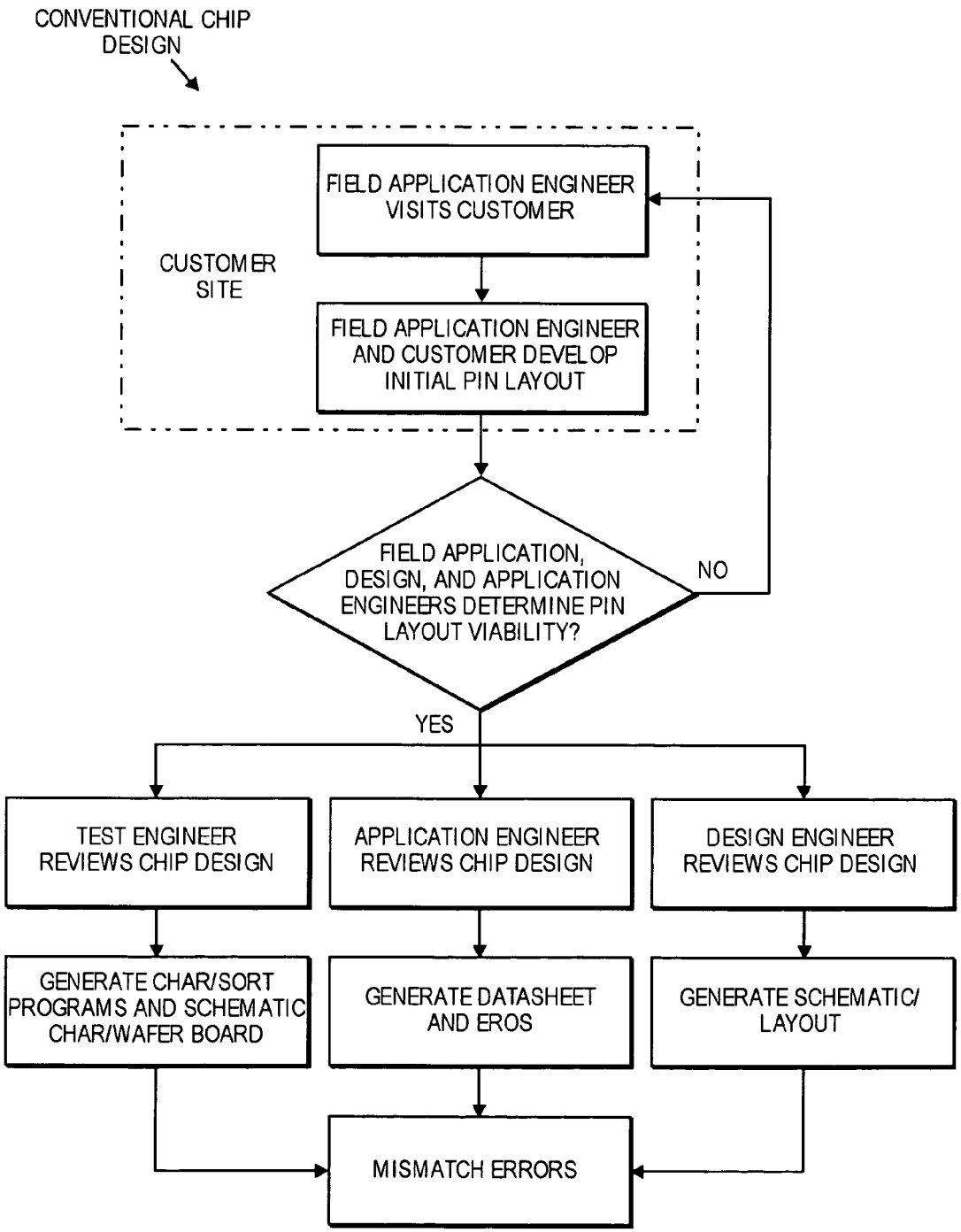
FIG. 1 illustrates a conventional chip design process.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

An automated integrated circuit development methodology is described by which integrated circuit (also referred to as a "chip") customization may be performed quickly and simply, with limited manual intervention. In one embodiment, the automated integrated circuit development methodology utilizes a software tool that integrates together various integrated circuit development operations (e.g., package recommendation; pin and pad assignment generation, related documentation generation such as data sheet and IBIS model; design operations such as netlist, schematic & layout generation; timing and functional verification, test and characterization operations, etc.) that may conventionally occur between the time an engineer (e.g., an application engineer) visits a customer to tape out of an integrated circuit design, using a correct by construction technique. With such a methodology and software tool, for example, a design engineer may visit a customer and perform operations at the customer site that, otherwise, would have been performed at the engineer's design site by one or more engineers. Embodiments of the methodology and software tool discussed herein may limit, or eliminate, the errors resulting from manual chip customization. Using chip customization rules, a proposed chip design may be correct by construction. Thus, mismatches between datasheets and the actual product may be reduced, or eliminated.

The methodology and software tool discussed herein may also improve the turnaround cycle time (TCT), or time that it takes to design and implement a chip, for integrated circuit customizations compared to conventional integrated circuit development techniques. In one exemplary embodiment, the development of a clock chip design may be performed and resulting samples of the clock chip may be provided to a customer in 11 days. It should be noted that such a time is only provided as an illustrative example and that other cycle times may be achieved with the methods and apparatus discussed herein.

Although particular embodiment describes the development of clock integrated circuits (e.g., oscillators, frequency synthesizers, clock buffers, etc.), the method and apparatus described herein may be used with the development of other types analog, digital or mixed signal integrated circuits. For example, in another embodiment, the methods and apparatus discussed herein may be used in the development of regulators where a regulator load change may be made through metal layer programming. In an alternative embodiment, the method and apparatus discussed herein may be used to re-target an integrated circuit design to a new input/output (I/O) cell library on new cells and functions.

Figure 2:
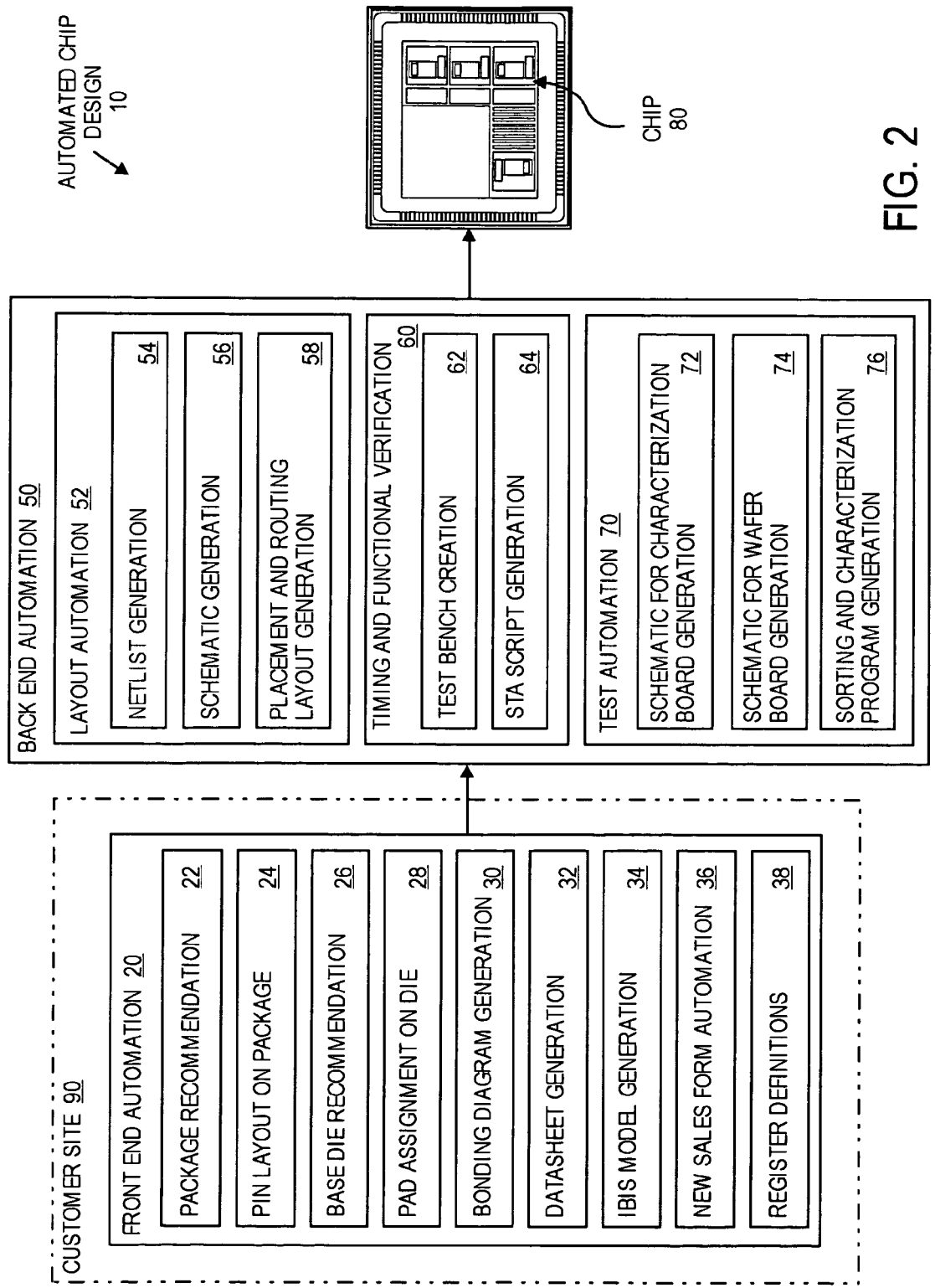
FIG. 2 illustrates one embodiment of an automated chip design process.

FIG. 2 illustrates one embodiment of an automated chip design process 10. The automated chip design process 10 includes many core design tools to enable the development of an integrated circuit design. In one embodiment, the core design tools may be divided into front end automation tools 20 and back end automation tools 50. The front end automation tools 20 may include one or more of a package recommendation tool 22, a pin layout tool 24, a base die recommendation tool 26, a pad assignment tool 28, and a bonding diagram tool 30. The front end automation tools 20 also may include one or more of a datasheet tool 32, a modeling tool 34, a new sales form tool 36, and a register definition tool 38. Each of these front end automation tools 20 is described in more detail below.

The back end automation tools 50 may include layout automation tools 52, including one or more of a netlist tool 54, a schematic tool 56, and a placement and routing layout tool 58. The back end automation tools 50 also may include verification tools 60, including a test bench tool 62 and a static timing analysis (STA) script tool 64. The back end automation tools 50 also may include test automation tools 70, including one or more of a characterization board tool 72, a wafer board tool 74, and a sorting and characterization program tool 76. Each of these back end automation tools 50 is described in more detail below.

In one embodiment, the front end automation tools 20 may be accessed via a single user interface such as a graphical user interface. For example, some or all of the front end automation tools 20 may be contained within a single software package tool, which may be accessible to a user via a single program interface such as a wizard. Having some or all of the front end automation tools 20 available within a single software tool package may facilitate more productive communications with a customer at a customer site 90. As an example, a datasheet may be generated and presented to the customer during a first consultation between the customer and a field application engineer, rather than after all of the chip design and testing is performed at another location. Alternatively, the front end automation tools 20 may be available to a user through a single interface over a distributed network such as a local area network (LAN), a wide area network (WAN), or the internet.

In one embodiment, the package recommendation tool 22 presents a recommended package to a user based on one or more user inputs. The package (also referred to as a chip package or chip carrier) houses an integrated circuit such as a base die or other electronic component. Pins or other contacts on the exterior of the package are coupled to the internal integrated circuit pads and available to connect to a circuit board or other circuit apparatus. In one example, the package recommendation tool 22 may present a recommended package to the user based on a package input parameter. One type of package input parameter may be a specified function requested by the user for a given pin on the package. Another type of package input parameter may be a total count of requested pins on the package. In another embodiment, the recommended package may depend on the physical attributes (e.g., size and layout) of a base die, the configuration of a circuit board for use with the package, or another design consideration. The determination of the recommended package may be subject to one or more package recommendation rules which define available packages and pertinent package considerations.

In one embodiment, the pin layout tool 24 presents a recommended pin layout to the user for the recommended package. Alternatively, the pin layout tool 24 may present a recommended pin layout to the user based on another package such as a predetermined package identified by the user. Although the pin layout tool 24 may recommend a pin layout for all of the pins on a given package, the pin layout tool 24 also may accommodate user-defined pins. For example, the pin layout tool 24 may reserve a predetermined pin for a predetermined input or output signal as specified by the user, and generate a recommended pin layout for the remaining, undefined pins. The determination of the recommended pin layout may be subject to one or more pin layout rules. Some exemplary pin layout rules pertain to the placement of complementary pins with differential outputs, proximity of pins (e.g., required adjacent pins or prohibited adjacent pins), contiguous pin banks, pin type maximums, mutual exclusivity, power domain, and other general and pin-specific considerations. Moreover, although this description references pins, a similar methodology may be applied to packages with other contact arrangements such as a ball grid array.

In one embodiment, the base die recommendation tool 26 presents a recommended base die to the user. The base die includes the components and circuitry to perform certain electronic functions. For example, the base die recommendation tool 26 may present a recommended base die to the user based on a package output parameter. One type of package output parameter may be a specified function or signal requested by the user, although other design considerations may impact the determination of the recommended base die. The determination of the recommended base die may be subject to one or more base die rules which define available base dies and pertinent base die considerations.

In one embodiment, the pad assignment tool 28 presents a recommended pad assignment to the user for the recommended base die. The pads include electrical bonding pads to which contact may be made for electrical connection to the package pins. The recommended pad assignment may depend at least in part, on the recommended or user-defined pin layout. In one embodiment, the determination of the recommended pad assignment may be subject to one or more pad assignment rules.

In one embodiment, the bonding diagram tool 30 generates a bonding diagram to graphically represent the electrical connections between the bonding pads on the base die and the package pins. On example of the bonding diagram is a functional bonding diagram that represents which pins are connected to which pads. Another example of the bonding diagram is a physical bonding diagram that represents metal layers that may be used route the connections between the pins and pads. In another embodiment, the bonding diagram tool 30 also may validate the generated bonding diagram. Validation refers to determining if the electrical connections portrayed in the bonding diagram can be physically implemented with the base die and package. In order to validate the bonding diagram, the bonding diagram tool 30 may reference one or more bonding rules.

Although certain embodiments may present the recommended pad assignment and the bonding diagram to the user, other embodiments may restrict access to the pad assignment and bonding diagrams. For example, the pad assignment tool 28 or bonding diagram tool 30 or both may prevent the recommended pad assignment or bonding diagram from being presented to the user unless authorization is provided. In this example, a user such as the customer may not see the recommended pad assignment or bonding diagram unless the field application engineer enters a command or access code to display the pad assignment or bonding diagram on the graphical user interface. This type of limited access subject to authorization also may be applied to other aspects of the automated chip design process 10.

In one embodiment, the datasheet tool 32 generates a datasheet and presents the datasheet to the user. The datasheet may include information to describe the particular chip design generated through the front end automation tools 20, as well as general chip information such as standard timing diagrams. In one embodiment, the datasheet tool 32 may present the datasheet to the user in a portable document format (PDF), although other formats may be used. In regard to the datasheet generation, the front end tools 20 potentially facilitate presenting the datasheet to a customer during the initial design with the field application engineer, rather than after multiple design and testing sessions (e.g., which may take several weeks). With the datasheet, the customer may evaluate the proposed chip design to possibly move forward with actual manufacturing, thereby placing the product incorporating the chip on the market sooner than with conventional chip design processes.

In one embodiment, the modeling tool 34 generates a model of the proposed chip design and presents the model to the user. One example of a model is an I/O buffer information specification (IBIS) to describe package parasitics and other package characteristics. Alternatively, the modeling tool 34 may generate and present other models to the user in addition to or in place of the IBIS model. Like delivering the datasheet to the customer, delivering the modeling information to the customer at the customer site 90 may facilitate faster chip manufacturing and product development.

In one embodiment, the new sales form tool 36 generates a new sales form (also referred to as a new sales opportunity (NSO) form) to request a pinout from a design engineer. The new sales form may be an internal document to the chip design company. A new sales order form may include information such as client information, chip design timelines, and whether the proposed chip design includes any new intellectual property (also referred to as IP cores, referring to the functional cores on the die). In another embodiment, the new sales form tool 36 may automatically propagate the new sales form to the design engineer or other departments involved in the design process.

In one embodiment, the register definition tool 38 allows the user to access default register settings and modify some or all of the register settings. For example, the user may define the register type of a particular register. In one embodiment, the manipulation of registers may be subject to one or more register rules.

Although several front end automation tools 20 and back end automation tools 50 are shown and described in reference to FIG. 2, other embodiments of the automated chip design process 10 may incorporate fewer or more automation tools. Additionally, particular tools may be incorporated into either the front end automation tools 20 or the back end automation tools 50. Furthermore, certain instances of the automated chip design process 10 may use less than all of the front end automation tools 20 at the customer site 90. Some of the front end automation tools 20 may be used, at least in part, at locations other than the customer site 90. Likewise, some of the back end automation tools 50 may be used, at least in part, at the customer site 90 or at another location other than a specific design or testing site.

In one embodiment, the layout automation tools 52 include the netlist tool 54, the schematic tool 56, and the placement and routing layout tool 58. The netlist tool 54 generates a netlist to describe the proposed chip design. The netlist may include an I/O ring netlist and a full chip netlist, which may include a compilation of individual block netlists. The netlist describes the electrical interconnections between internal pins of the components, or instances, of the integrated circuit. (These internal pins on the base die are different from the package pins.) The schematic tool 56 generates a full chip schematic of the proposed chip design. The placement and routing layout tool 58 generates a placement and routing plan for the metallization layers of the proposed chip design. In placement, the gates in the netlist are assigned to non-overlapping locations on the die area. In routing, the wires (i.e., interconnect traces) that connect the gates in the netlist are added. The integrated circuit layout may be generated using the netlist or another description of the integrated circuit such as schematics, text files, hardware description languages, and so forth. In another embodiment, the layout automation tools 52 may include other tools such as, for example, an I/O ring generation tool to create an I/O ring layout.

In one embodiment, the verification tools 60 include the test bench tool 62 and the static timing analysis (STA) script tool 64. Verification refers to verifying that a logic design does what it is intended to do. Verification may be performed using logic simulation, hardware emulation, or another verification technology. The test bench tool 62 generates a test bench to test the layout and proposed chip design. In one embodiment, the test bench contains the descriptions of circuit stimuli and corresponding outputs which verify the behavior of the design over time. The static timing analysis script tool 64 runs static timing analysis checks on the layout and generates a static timing analysis script for the proposed chip design. The static timing analysis script may be used for verification, for example, to run a static timing analysis of the proposed chip design. The static timing analysis may analyze the expected timing of the proposed chip design. In another embodiment, the verification tools 60 may include other tools such as timing and verification tools.

In one embodiment, the test automation tools 70 include the characterization board tool 72, the wafer board tool 74, and the sorting and characterization generation tool 76. The characterization board tool 72 generates a characterization board schematic. The wafer board tool 74 generates a wafer board schematic. The characterization and wafer board is the physical circuit board that is used to test the developed integrated circuit. In one embodiment, the sorting and characterization program tool 76 generates a sorting program and a characterization program for the proposed chip design. The sorting program facilitates die testing on the wafer to determine if a given die is functional. The characterization program facilitates characterizing, or testing, the inputs and outputs of each die compared with an expected characterization developed during the design of the chip. The characterization test verifies the operational specifications of the proposed chip design and/or establishes new operational specifications for the proposed chip design. The characterization program may be used in conjunction with the characterization and wafer board to specify what inputs are used to test the developed integrated circuit. In another embodiment, the sorting and characterization program tool 76 may be included in the front end automation tools 20 rather than the back end automation tools 50. In another embodiment, the test automation tools 70 may include other tools.

Figure 3:
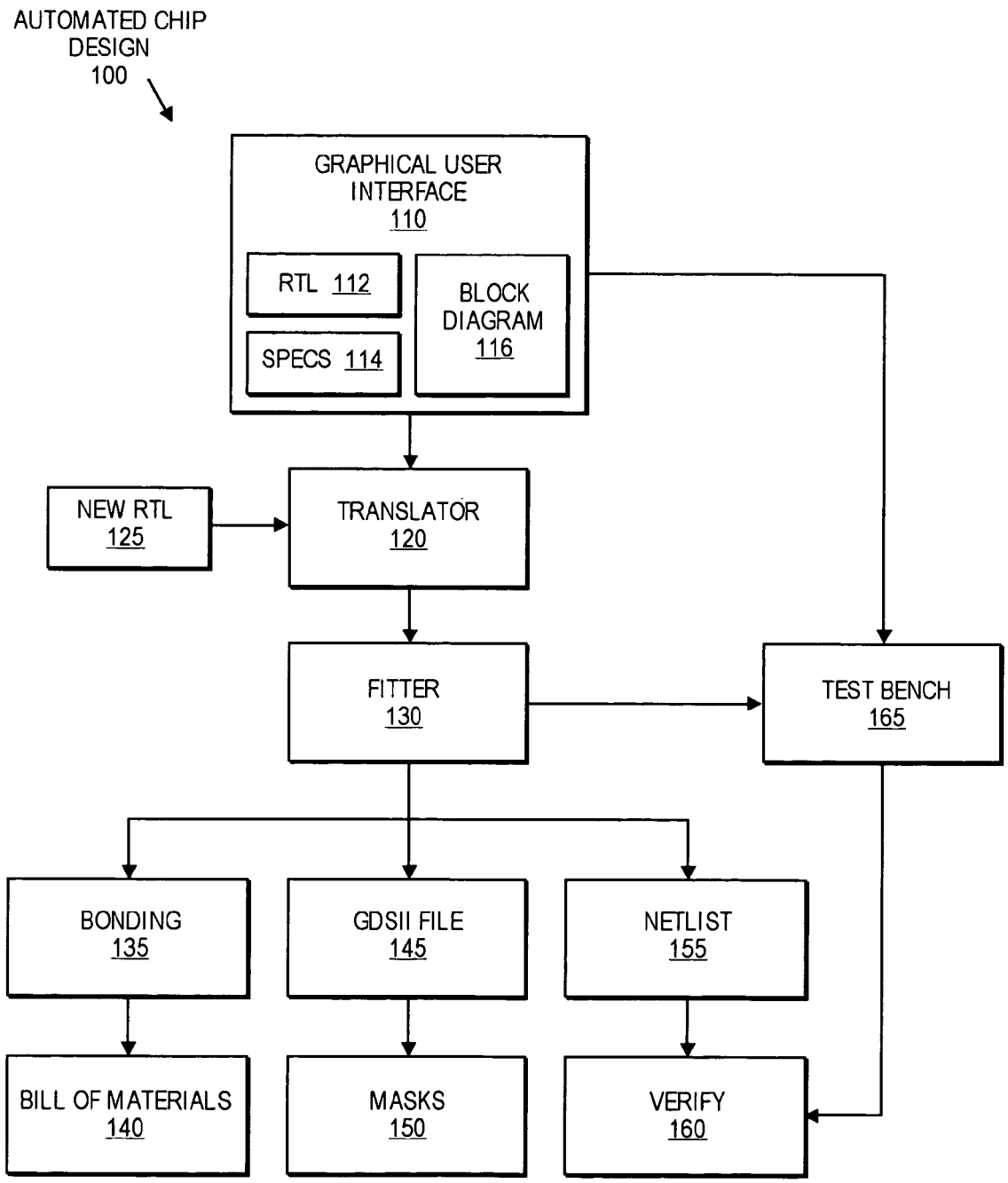
FIG. 3 illustrates one embodiment of an automated chip design system.

FIG. 3 illustrates one embodiment of an automated chip design system 100. Although some embodiments described herein refer to a front end and a back end, the automated chip design system 100 is not necessarily divided into a front end and a back end. Moreover, the functions and operations otherwise designated as front end and back end functions and operations may be implemented together in the automated chip design system 100.

The depicted chip design system 100 includes a graphical user interface (GUI) 110 to display register transfer language (RTL) code 112, chip specifications 114, and a block diagram 116. As previously mentioned, the RTL code 112 is an abstract circuit description to describe core regions of the base die and connections to the pads. The chip specifications 114 are design constraints that describe the performance of the proposed integrated circuit. In one embodiment, the chip specifications 114 may be used to generate the RTL code 112. The block diagram is 116 is a graphical representation of the proposed integrated circuit design. The block diagram 116 may show internal components of the base die, pads on the base die, connections between the internal components and pads, and so forth.

Alternatively, the graphical user interface 110 may display fewer or more display components. The graphical user interface 110 may display several display components (e.g., windows for automation tools) at once, or may display each display component separately. For example, the graphical user interface 110 may display the RTL 112 at one time and the block diagram 116 at another time. In one embodiment, the block diagram 116 represents a chip design such as a package with pins, a base die with pads, a bonding diagram, register definitions, or other information related to the chip design. Additionally, the graphical user interface 110 may display datasheets, models, reports, forms, and other information related to the chip design.

The graphical user interface 110 interfaces with a translator 120 which allows the information from the graphical user interface 110 to be used by the fitter 130. For example, a user may convert the user specifications 114 of the integrated circuit design into a register transfer level (RTL) description 112 that provides a behavioral model of the integrated circuit design. The behavioral model (e.g., written in C++) is used to generate a test bench 165 which contains the descriptions of circuit stimulus and corresponding outputs that are used to verify 160 the behavior of the integrated circuit design over time, as discussed below.

A translator 120 may be used, in one embodiment, to automatically translate the RTL model 112 in one language to an equivalent, or formatted, RTL model 112 in a language such as Very High Speed Integrated Circuit (VHSIC) hardware description language (VHDL) such as Verilog. Such languages are hardware description languages (HDL) that support the design, testing, and implementation of integrated circuits at various levels of abstraction. RTL descriptions 112 and HDLs are known in the art; accordingly, a more detailed discussion is not provided.

In one embodiment, new RTL 125 also may be input to the translator 120, for example, to create a new option for an existing chip design. In an illustrative embodiment, the new RTL 125 implements changes to the original RLT 112 in order to accommodate a different type of package, or alternatively to implement customer requirements not implemented by the original RLT 112. Customer requirements may be specified in documents such as an external requirements output specification (EROS) or an internal requirements output specification (IROS) provided by the customer or generated by the field application engineer. In this manner, an existing integrated circuit design, or prior iteration of a design, may be modified to create a new integrated circuit design. In other words, the new RTL code 125 that is input into the translator 120 can be used to append to a pre-existing netlist or to modify and/or update the existing netlist. Modification of an existing design through updating the original RTL 112 with new RTL 114 may facilitate shorter design times for integrated circuits.

The translator 120 outputs formatted RTL with constraints to the fitter 130. In one embodiment, the fitter 130 may use some or all of the front end automation tools 20 to generate a pin-to-pad mapping to customize a base die and a package. The user may perform logic synthesis in which the fitted RTL is turned into a design implementation in terms of a gate level netlist 155 using a hardware descriptor language (HDL) to describe the connectivity of the proposed chip design. The design engineer may perform layout verification 160 using a technique referred to as design rule checking (DRC). If the layout violates design rules, then the designed IC may not function. The layout of the IC may be generated in a GDSII format and input to DRC software which generates a report of design rule violations. After verification 160, where the RTL model is validated, a prototype, or commercial unit, of the integrated circuit design can be fabricated. To fabricate the verified IC design, the GDSII files also may be used as an output to generate the masks 150 that are used to fabricate the IC dies.

The fitter 130 also may produce a bonding output 135 to generate a bill of materials 140 for the proposed chip design. The fitter 130 also may be used by the test bench 165 to verify 160 the behavior of the design over time.

Figure 4:
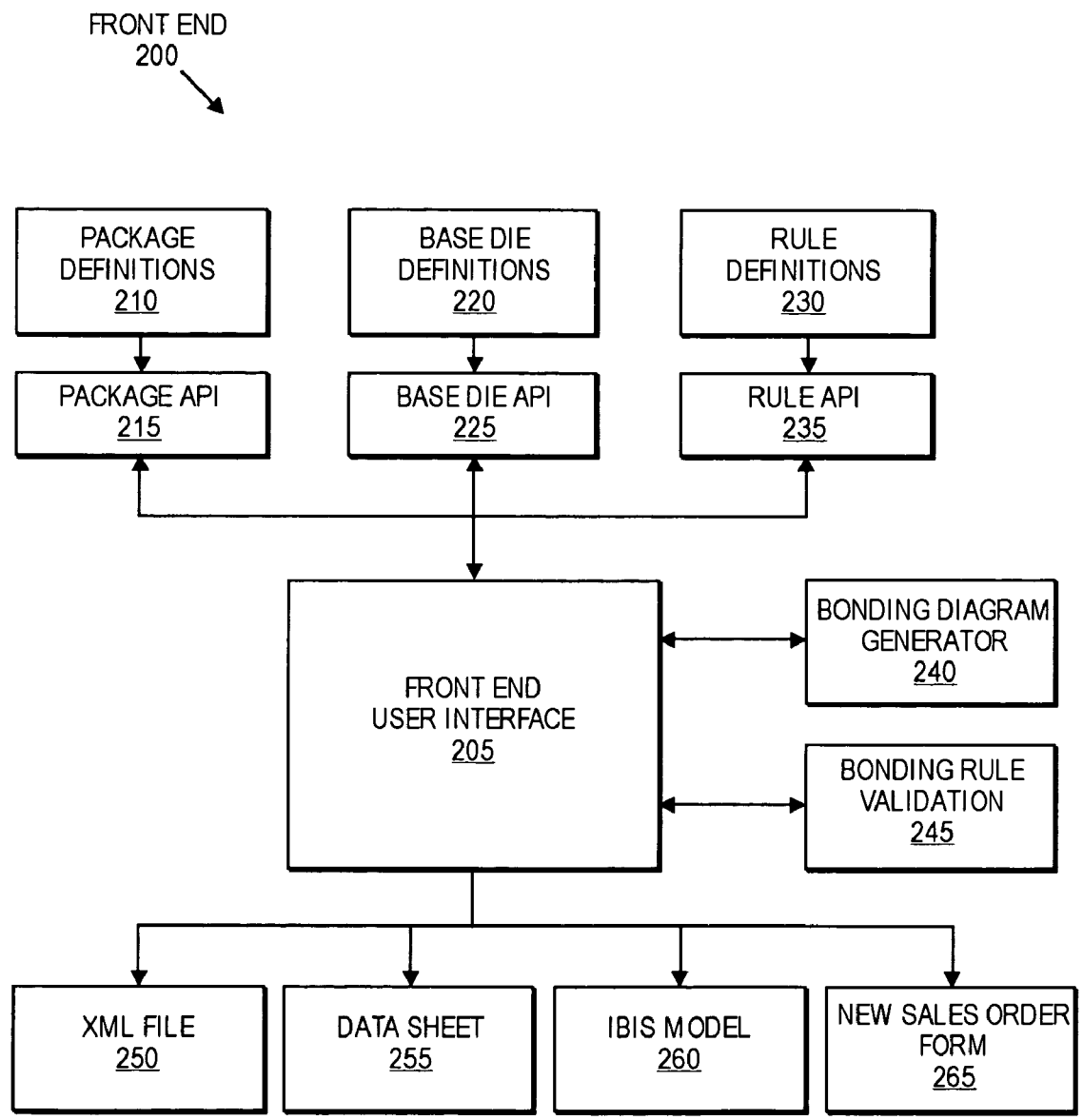
FIG. 4 illustrates one embodiment of a front end automation system.

FIG. 4 illustrates one embodiment of a front end automation system 200. The depicted front end automation system 200 may implement many of the front end automation tools 20 shown in and described with reference to FIG. 2. A front end user interface 205 is used to interface with the various components of the front end automation system 200. In one embodiment, the front end automation interface 205 is a graphical user interface, and the front end automation system 200 is implemented in a laptop computer (not shown), although other configurations may be implemented.

Package definitions 210 are available to the front end user interface 205 via a package application user interface (API) 215. The package definitions 210 may be stored in a database and define the characteristics (e.g., size, number of pins, etc.) of various packages. The package recommendation tool 22 may reference the package definitions 210 in order to determine a recommended package, as described above.

Base die definitions 220 are available to the front end user interface 205 via a base die API 225. The base die definitions 220 may be stored in a database and define the characteristics (e.g., size, IP cores, number of pads, etc.) of one or more base dies. The base die recommendation tool 26 may reference the base die definitions 220 in order to determine a recommended base die, as described above.

Rule definitions 230 are available to the front end user interface 205 via a rule API 235. The rule definitions 230 may be stored in a database and define one or more rules that may be used by the front end system 200 to generate a chip design. For example, the pin layout tool 24 may reference the rule definitions 230 to generate the recommended pin layout, as described above. Similarly, the pad assignment tool 28 may reference the rule definitions 230 to generate the recommended pad assignment, as described above. In another embodiment, the rule definitions 230 may include rules pertaining to other aspects of the automated chip design process 10.

A bonding diagram generator 240, which may be similar to or the same as the bonding diagram tool 30, generates a bonding diagram for the chip design. The bonding diagram may or may not be displayed to the user via the front end user interface 205. The bonding rule validation module 245 also interfaces with the front end user interface 205 to determine if the generated bonding diagram complies with bonding rules. In one embodiment, the rule definitions 230 may include one or more bonding rules. The bonding rules may define functional or physical bonding characteristics of a viable chip design.

Using the front end automation tools 20, the front end user interface 205 may present several outputs to a user. For example, the front end user interface 205 may present an output file to the user so the user can save the file for future reference. The output file may store one or more design parameters for a particular chip design so that the user may save the design project in, for example, an extensible markup language (XML) file 250 and later re-open the design project, or save it and send the file to another person such as a design engineer. Alternatively, the output file may be a datasheet 255 to describe the chip design specification. In another embodiment, the output file may be a modeling report 260 such as an I/O buffer information specification (IBIS) model. In another embodiment, the output file may be a new sales order (or new sales opportunity) form 265. Additionally, the data format of the output file may vary depending on the type of output or depending on a user selection.

Figure 5:
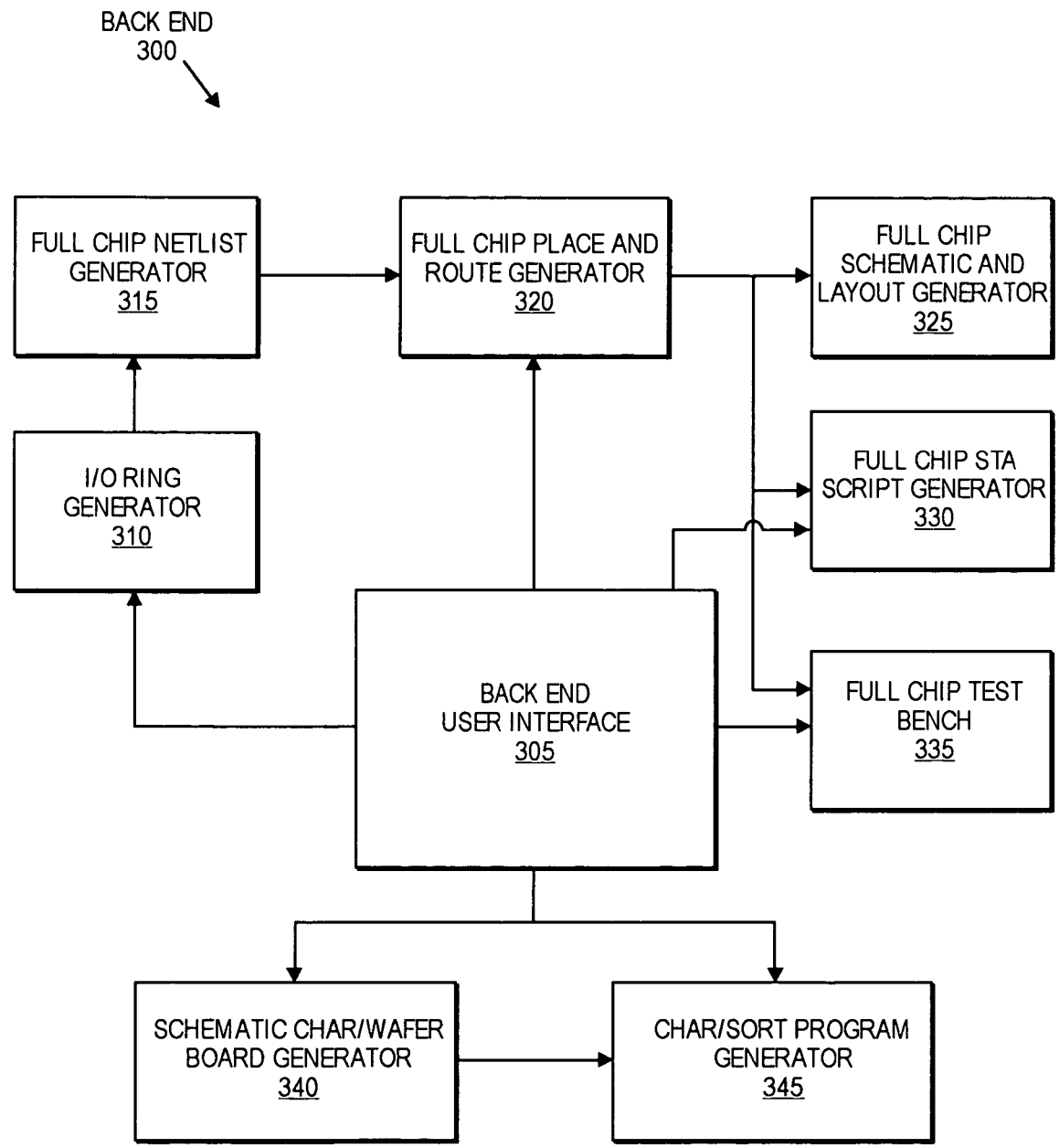
FIG. 5 illustrates one embodiment of a back end automation system.

FIG. 5 illustrates one embodiment of a back end automation system 300. The depicted back end automation system 300 may implement many of the back end automation tools 50 shown in and described with reference to FIG. 2. A back end user interface 305 is used to interface with the various components of the back end automation system 300. In one embodiment, the back end automation interface 305 is a graphical user interface, and some or all of the back end automation system 300 is implemented in a laptop computer (not shown), although other configurations may be implemented.

The back end user interface 305 interfaces with an I/O ring generator 310 to generate an I/O ring configuration for the proposed chip design. In one embodiment, the I/O ring configuration may depend on the recommended pad assignment and bonding diagram. The I/O ring generator 310 may use an I/O catalog, RTL data, or other information available through the back end user interface 305. The I/O ring generator 310 interfaces with a full chip netlist generator 315 to generate a netlist for the proposed chip design. In one embodiment, the I/O ring generator 310 passes hardware descriptor language (HDL) data such as a Verilog file to the full chip netlist generator 315. The resulting netlist, as well as synopsis design constraints related to the chip timing, are passed to the full chip place and route generator 320. The full chip place and route generator 320 also receives data available through the back end user interface 305, including I/O definitions, library data such as library exchange format (LEF) files, route constraints, and clock specifications. Other embodiments may provide less or more data to the full chip place and route generator 320.

The full chip place and route generator 320 generates the placement and routing data for the proposed chip design. The placement and routing data may be expressed as a netlist or in another format. The placement and routing data is made available to the full chip schematic and layout generator 325, the full chip static timing analysis (STA) script generator 330, and the full chip test bench 335. The full chip schematic and layout generator 325 generates a full chip schematic and layout for the proposed chip design. The full chip static timing analysis script generator 330 generates STA scripts for the proposed chip design. The full chip static timing analysis script generation 330 also may use constraints and other data available through the back end user interface 305. The full chip test bench 335 generates a test bench for the proposed chip design. The full chip test bench 335 also may use other data available through the back end user interface 305.

The back end user interface 305 also interfaces with a schematic characterization/wafer board generator 340 and a characterization/sorting program generator 345. The characterization/wafer board generator 340 generates a characterization board schematic and a wafer board schematic. The characterization and sorting program generator 345 generates a characterization program and a sorting program, as described above.

Figure 6:
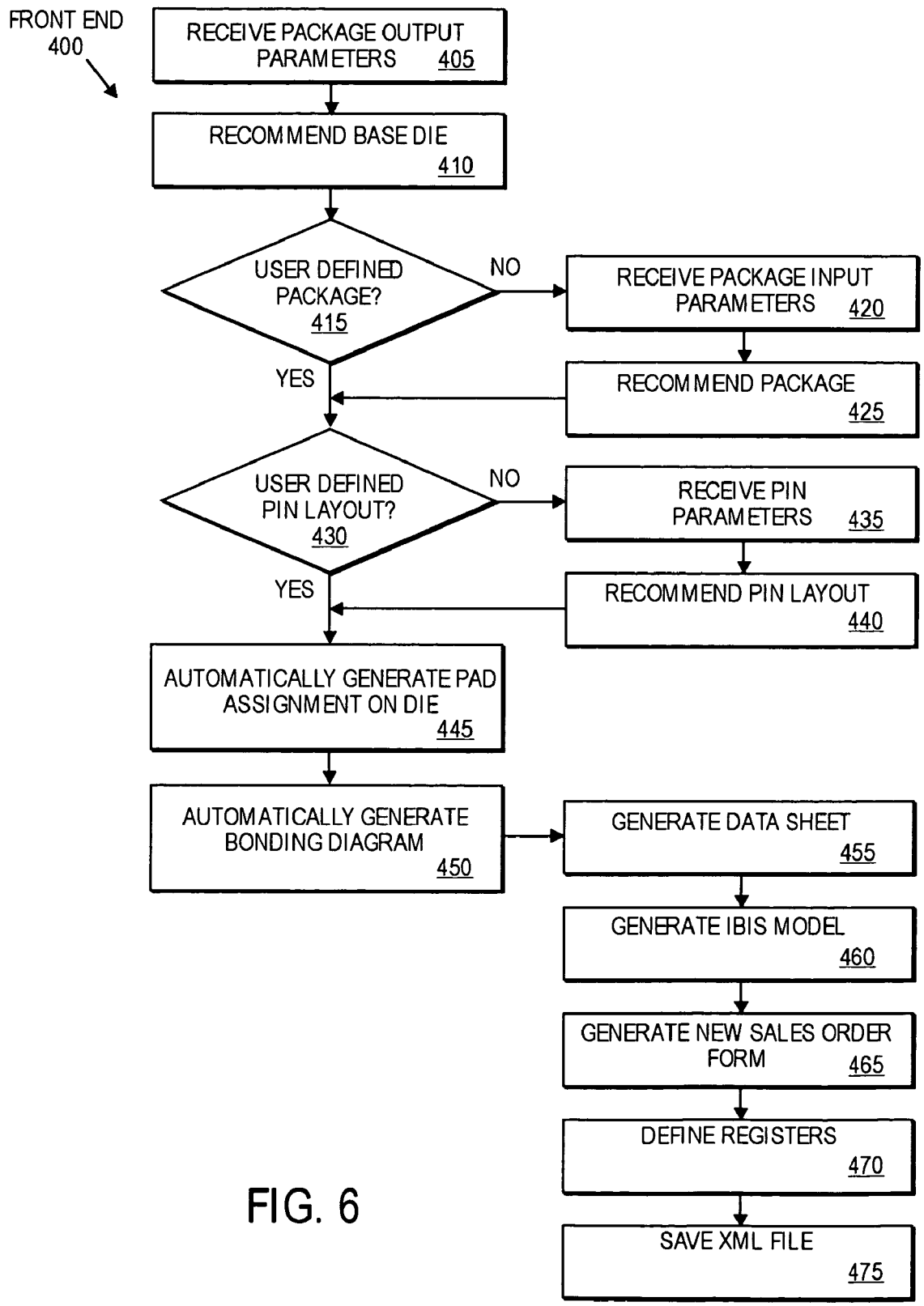
FIG. 6 illustrates one embodiment of a front end automation method.

FIG. 6 illustrates one embodiment of a front end automation method 400. The front end automation method 400 may be implemented using the automated chip design process 10, the automated chip design system 100, the front end automation system 200 and the back end automation system 300, or another automated chip design technology. Alternatively, the front end automation method 400 may be implemented with a combination of automated chip design processes, tools, and systems. For convenience, the front end automation method 400 is described with reference to the front end system 200 of FIG. 4.

In one embodiment, the front end automation method 400 begins when a user interfaces with the front end graphical interface 205. The user inputs and the front end user interface 205 receives 405 a packet output parameter. The package output parameter may be a specified pin output or another user-defined output parameter. Using the base die definitions 220 and the base die API 225, the front end user interface 205 presents 410 a recommended base die to the user. Alternatively, the user may specify a base die. The recommended or specified base die may be referred to as a selected base die.

The front end user interface 205 then determines 415 if there is a user-defined package. In one embodiment, the front end user interface 205 may present an option to the user to specify a particular package. If there is no user-defined package, the user inputs and the front end user interface 205 receives 420 a package input parameter. The package input parameter may be a specified pin input or another user-defined input parameter. Using the package definitions 210 and the package API 215, the front end user interface 205 presents 425 a recommended package to the user. The recommended or user-specified package may be referred to as a selected package.

The front end user interface 205 then determines 430 if there is a user-defined pin layout. In one embodiment, the front end user interface 205 may present an option to the user to define a pin layout, including some or all of the pins on the selected package. If there is no user-defined pin layout, the user inputs and the front end user interface 205 receives 435 a pin parameter. The pin parameter may be a specified input function, location, or other user-defined pin parameter. Using the rule definitions 230 and the rule API 235, the front end user interface 205 presents 440 a recommended pin layout to the user.

The front end user interface 205 then automatically generates 445 a pad assignment on the selected base die. The front end user interface 205 also automatically generates 450 a bonding diagram. Making trivial menu selections or other use inputs into the front end user interface 205 in order to initiate an otherwise automated process is within the scope of the term "automatic," as used herein. In other words, an operation may be considered automatic even if it does not begin until a user selects a menu item designating the corresponding operation.

After an initial pin-to-pad mapping such as a bonding diagram is generated, the front end user interface 205 generates 455 a datasheet, generates 460 an I/O buffer information specification (IBIS) model, and generates 465 a new sales order form, as described above. The front end user interface 205 also allows a user to define 470 one or more registers associated with the proposed chip design. Additionally, the front end user interface 205 may allow a user to save 475 the proposed chip design in an XML or other format. The depicted front end automation method 400 then ends.

Figure 7:
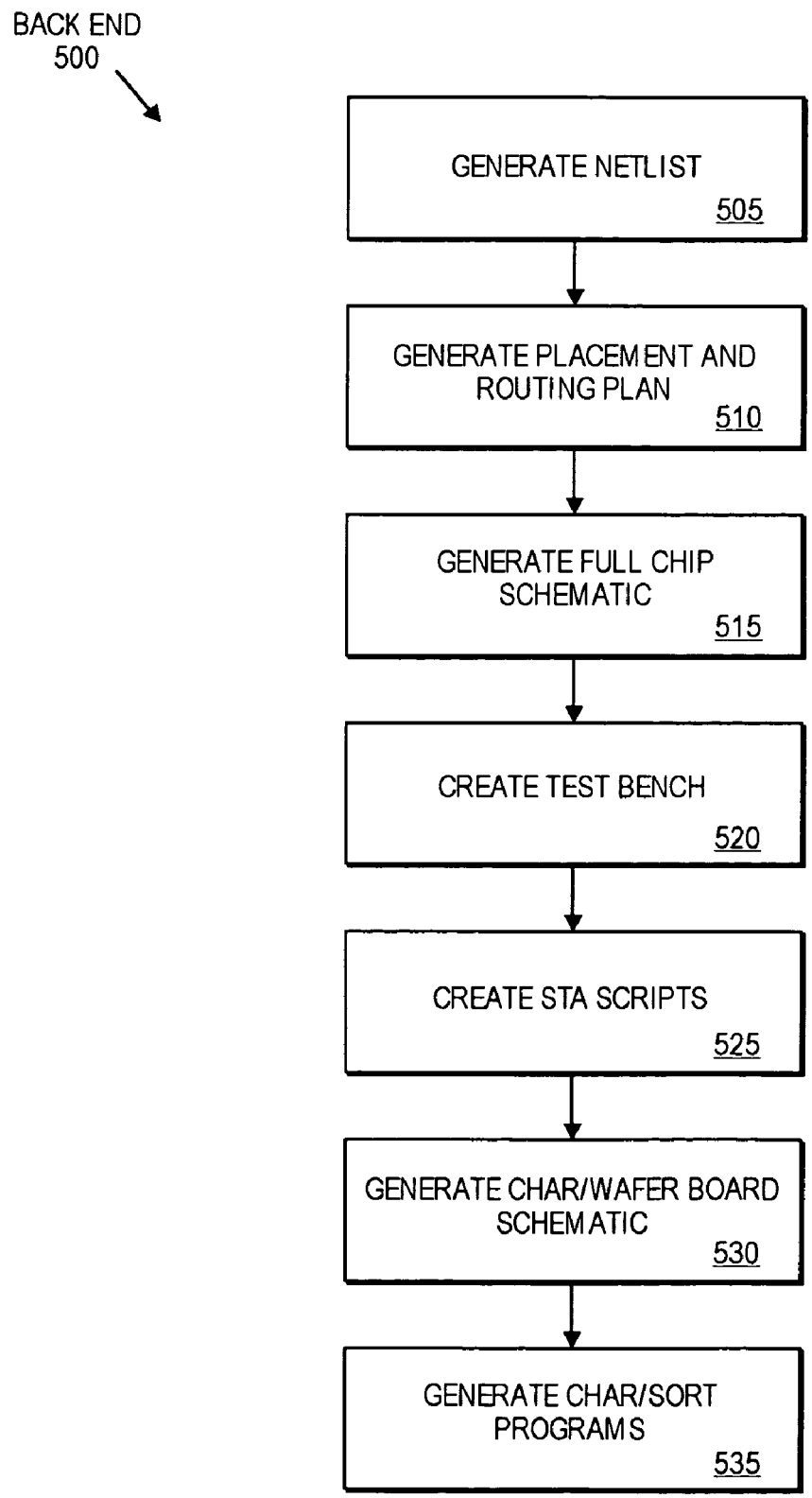
FIG. 7 illustrates one embodiment of a back end automation method.

FIG. 7 illustrates one embodiment of a back end automation method 500. The back end automation method 500 may be implemented using the automated chip design process 10, the automated chip design system 100, the front end automation system 200 and the back end automation system 300, or another automated chip design technology. Alternatively, the back end automation method 500 may be implemented with a combination of automated chip design processes, tools, and systems. For convenience, the back end automation method 500 is described with reference to the back end system 300 of FIG. 5.

In one embodiment, the back end automation method 500 begins when a user loads an output file with a saved chip design from the front end system 200 into the back end system 300. The back end user interface 305 may facilitate loading the saved chip design. The back end user interface 305 then initiates operations to generate 505 a netlist to describe the saved chip design. Subsequently, the back end user interface 305 generates 510 a placement and routing plan, or layout, as described above. The back end user interface 305 also generates 515 a full chip schematic. The back end user interface 305 then creates 520 a test bench and creates 525 static timing analysis (STA) scripts. Finally, the back end user interface 305 generates 530 a characterization board schematic and generates 535 a wafer board schematic. The depicted back end automation method 500 then ends.

Figure 8:
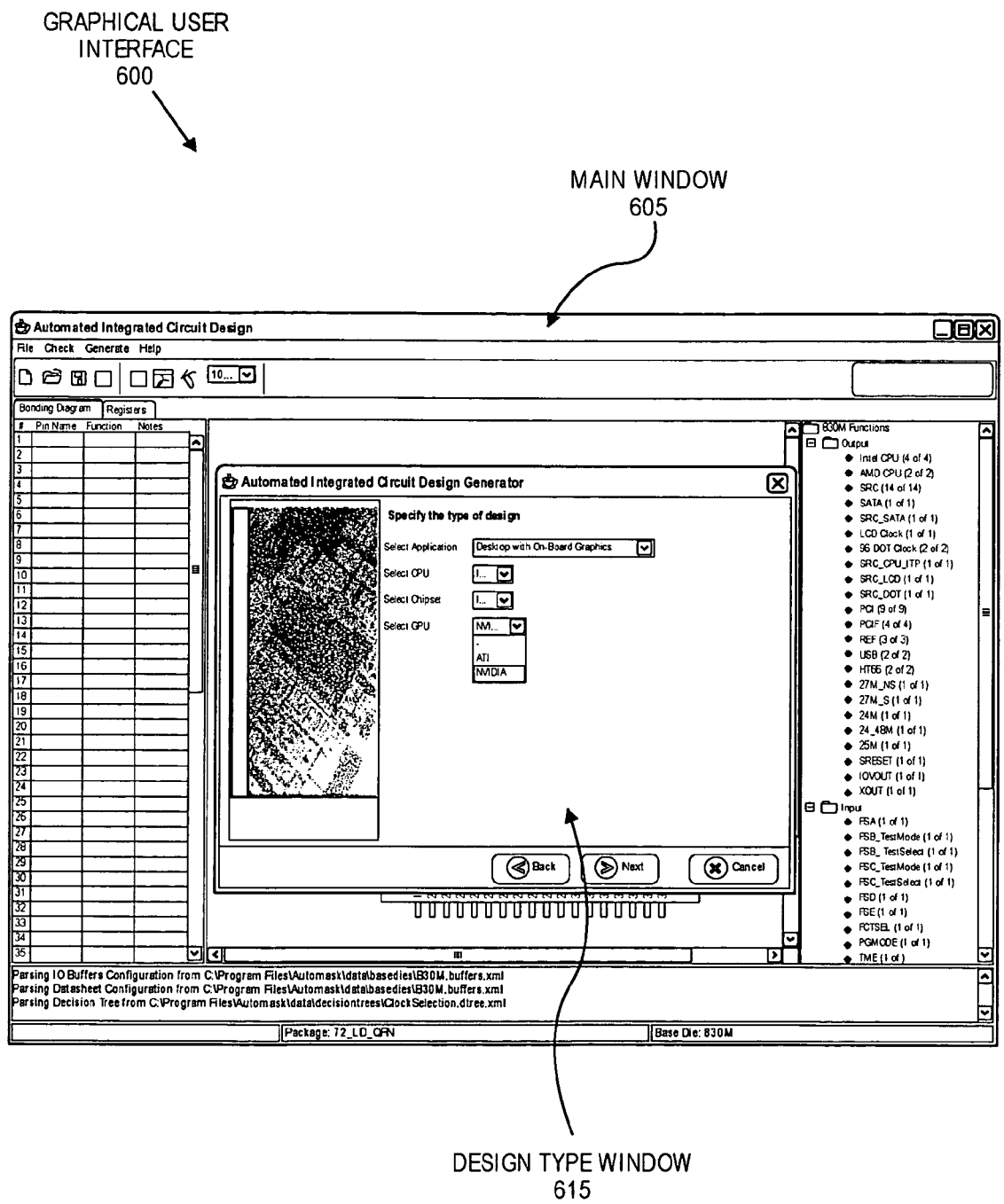
FIG. 8 illustrates one embodiment of a graphical user interface for front end automation with a main window and a design type window.

FIG. 8 illustrates one embodiment of a graphical user interface 600 with for front end automation with a main window 605 and a design type window 615. The graphical user interface 600 may be provided through a computer system, such as a desktop computer, a workstation, a laptop computer, or another computing device (not shown). Although the graphical user interface 600 is shown and described using windows-based interfaces (i.e., separate, overlapping windows are depicted for various functions), other types of interfaces and/or presentations schemes may be employed. Moreover, other types of windows may be implemented in addition to the windows shown in the figures and described herein. For example, the graphical user interface 600 may implement a startup window, a rule compliance window, a pin layout window, a datasheet window, a modeling window, a new sales window, and other windows.

In one embodiment, a user may start up the graphical user interface 600 by starting a wizard or another program on the computing device. The main window 605 is described in more detail with reference to the following figures. Throughout the description of the following figures, several types of user input fields are shown, including radio buttons, text buttons, text boxes, drop-down menus, check boxes, and so forth, although other embodiments may employ other types of user inputs. Additionally, although the input fields, indicators, bars, windows, and other display components of the graphical user interface 600 are shown in a particular arrangement in the following figures, the relative locations of input fields, indicators, bars, windows, and other display components of the graphical user interface 600 may be rearranged in other embodiments. Additionally, the sequence in which windows and data are presented to a user may be different from the sequence of the following figures. Furthermore, the graphical user interface 600 may present fewer or more windows or other interface components to the user than are shown in the following figures.

Furthermore, some aspects of the following figures relate specifically to chip designs for clock chips. The description of clock chip designs is merely for convenience. Other embodiments may be implemented for other types of chip designs. For example, aspects of the embodiments described below may be used to facilitate automatic design of image sensors, signal controllers, framers and mappers, and other integrated circuits.

In one embodiment, a startup window (not shown) allows a user to create a new chip design project or to open an existing chip design project. In other embodiments, the startup window also may allow a user to specify directory paths, identify a user or customer, input standard project parameters, and so forth.

In one embodiment, the design type window 615 allows a user to specify the type of design for the proposed chip design. As exemplary selections, the design type window 615 may include selections pertaining to an application for the proposed chip design, preferred compatibility with a specified central processing unit (CPU), preferred compatibility with a specified chipset, and preferred compatibility with a specified graphics processing unit (GPU). Other embodiments, may allow the user to specify other design type fields.

Figure 9:
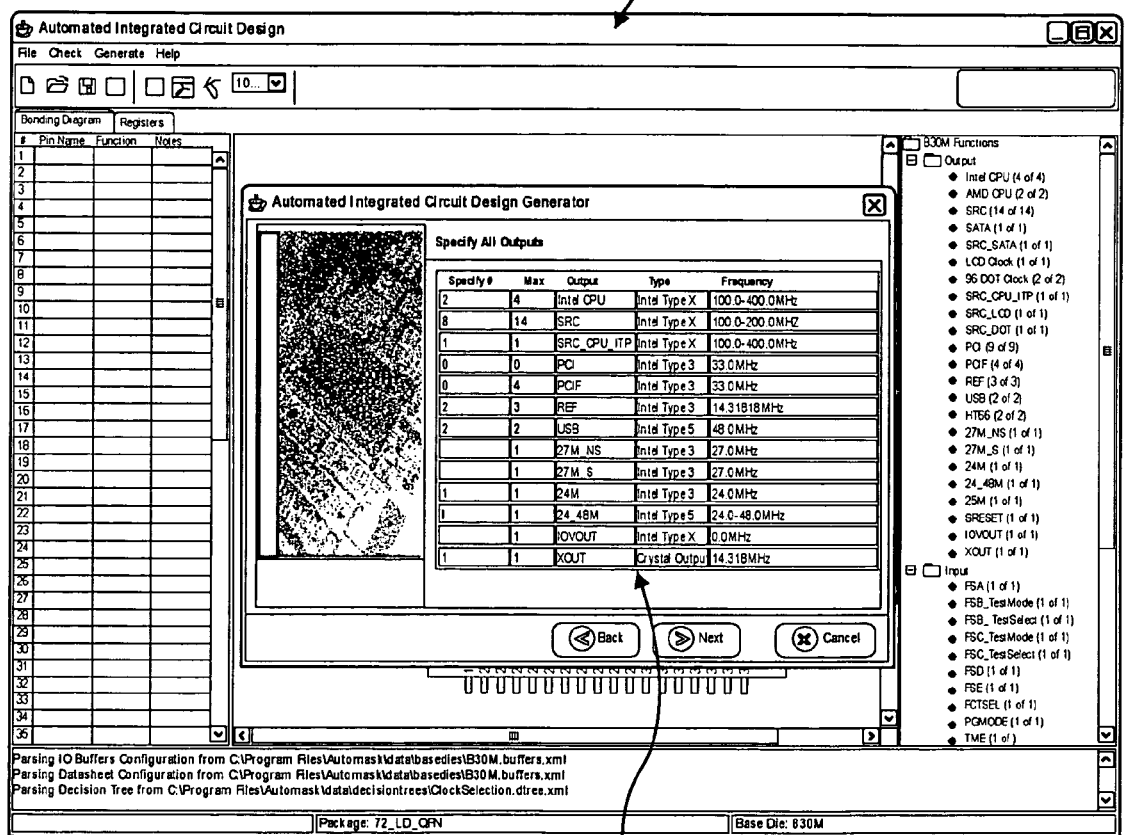
FIG. 9 illustrates another embodiment of the graphical user interface for front end automation with an output specification window.

FIG. 9 illustrates another embodiment of the graphical user interface 600 for front end automation with an output specification window 620. In one embodiment, the output specification window 620 allows a user to specify one or more outputs of the proposed chip design. These outputs correspond to the package pins of the proposed chip design (although the package may or may not be specified prior to identification of the specified outputs). The output specification window 620 may present default information to the user for several typical outputs. The default information may include output functions, output types, output frequencies (for clock signals), maximum output quantities per package, and so forth. In some embodiments, the user may be able to modify the default information. Additionally, the output specification window 620 allows the user to specify a given quantity of different outputs for the proposed chip design.

Figure 10:
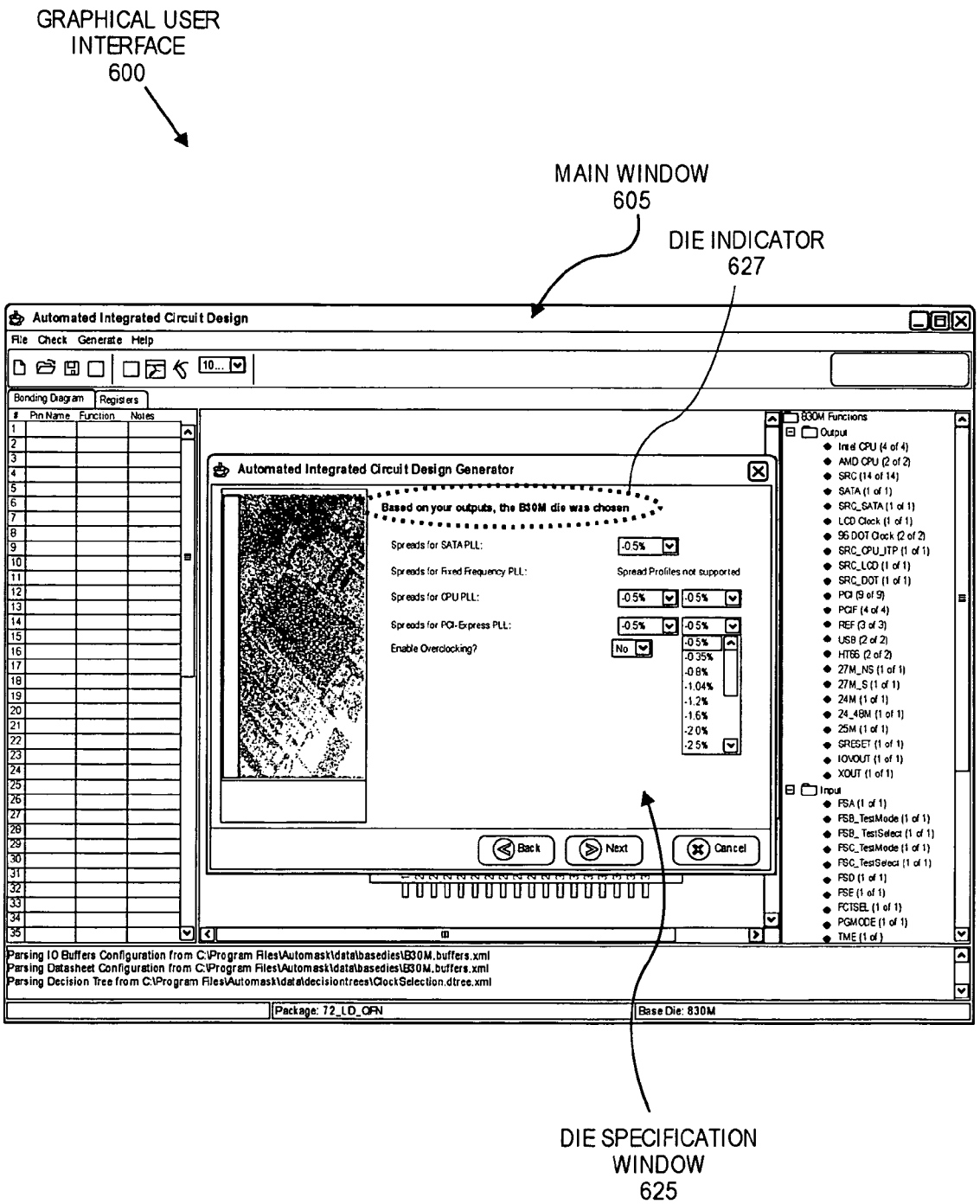
FIG. 10 illustrates another embodiment of the graphical user interface for front end automation with a die specification window.

FIG. 10 illustrates another embodiment of the graphical user interface 600 for front end automation with a die specification window 625. In one embodiment, the die specification window 625 presents a recommended base die to the user. For example, the recommended base die may be presented through the base die indicator 627. The recommended base die may be determined according to the outputs specified through the output specification window 620. Additionally, the die specification window 625 may allow a user to specify other parameters of the base die, such as spreads, overclocking signals (for clock chips), and so forth. In certain embodiments, the die specification window 625, or other windows, may indicate that particular functions are not supported or specific characteristics are not configurable.

Figure 11:
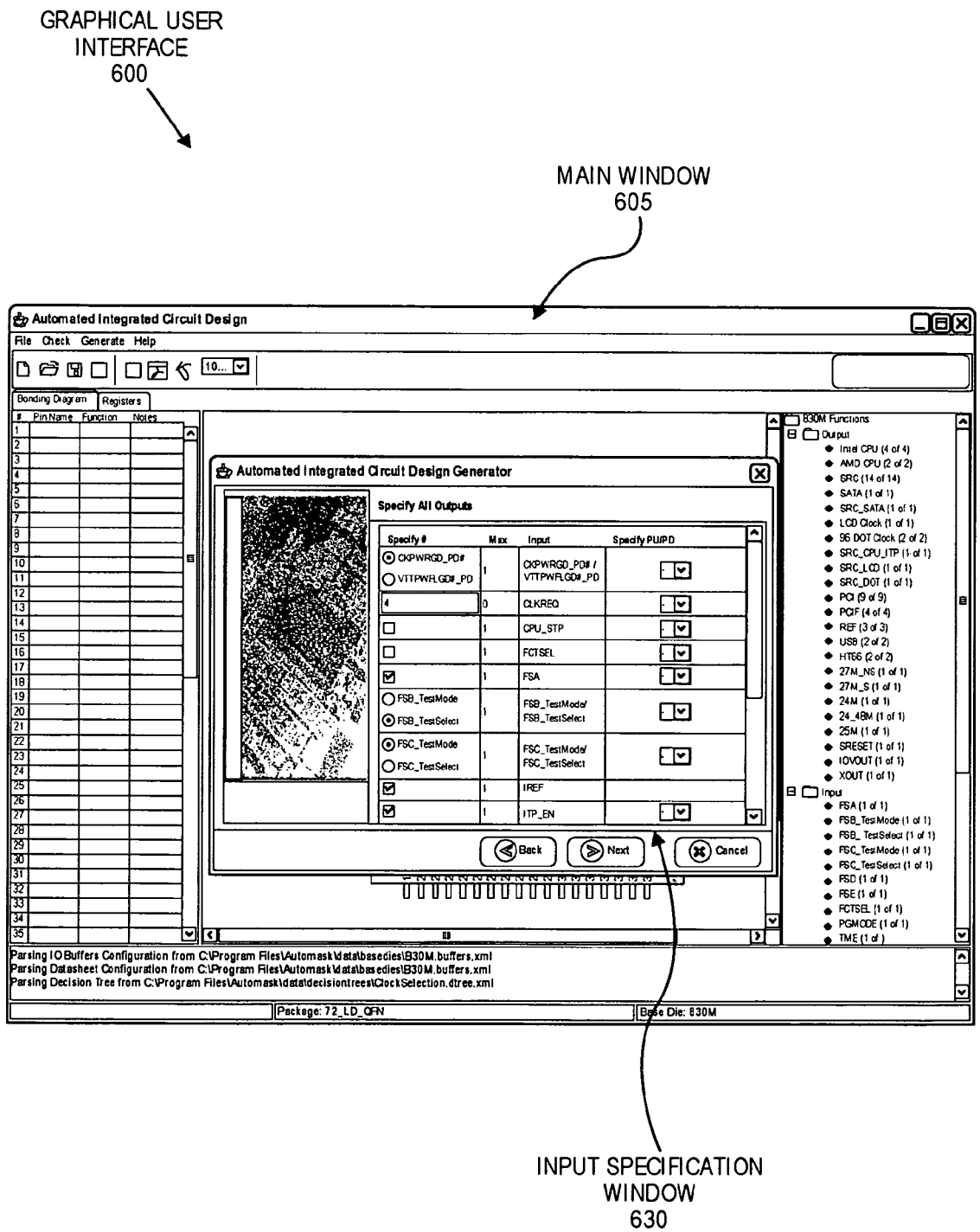
FIG. 11 illustrates another embodiment of the graphical user interface for front end automation with an input specification window.

FIG. 11 illustrates another embodiment of the graphical user interface 600 for front end automation with an input specification window 630. In one embodiment, the input specification window 630 allows a user to specify one or more inputs of the proposed chip design. These inputs correspond to the package pins of the proposed chip design (although the package may or may not be specified prior to identification of the specified inputs). The input specification window 630 may present default information to the user for several typical inputs. The default information may include input functions, input types, pull-up and pull-down configurations (for clock signals), maximum input quantities per package, and so forth. In some embodiments, the user may be able to modify the default information. Additionally, the input specification window 630 may allow the user to specify a given quantity of different inputs for the proposed chip design.

Additionally, a rule compliance window (not shown) indicates whether a proposed chip design complies or does not comply with a chip design rule such as a bonding rule, a pin layout rule, a pad assignment rule, or another chip design rule. Moreover, the rule compliance window may indicate that certain input modes are mutually exclusive and cannot be selected together as inputs for a chip design. Although errors may be indicated by the rule compliance window in the form of a pop-up window within the graphical user interface 600, other types of notification techniques may be used to notify a user of an error, a design consideration, and so forth.

Figure 12:
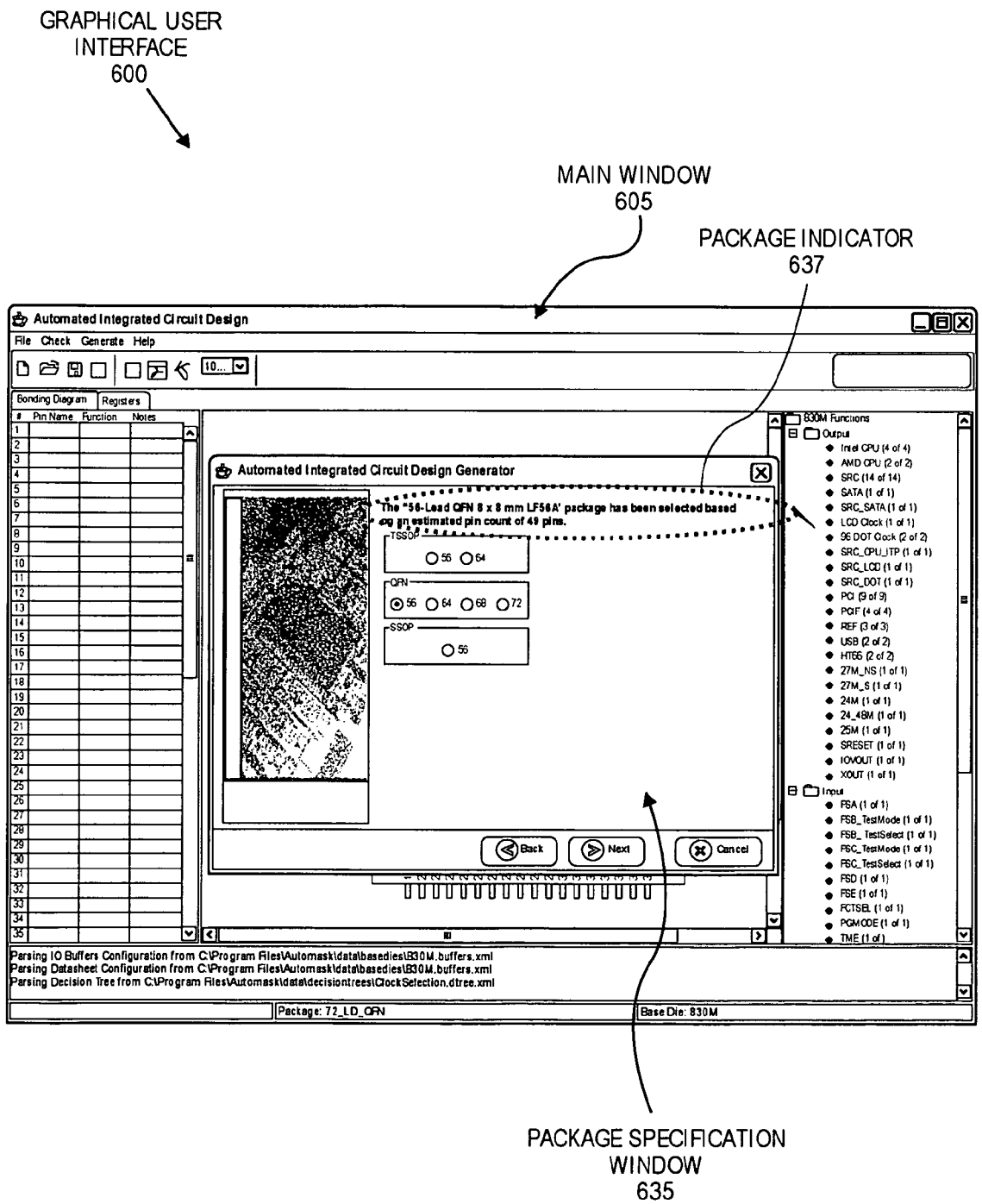
FIG. 12 illustrates another embodiment of the graphical user interface for front end automation with a package specification window.

FIG. 12 illustrates another embodiment of the graphical user interface 600 for front end automation with a package specification window 635. In one embodiment, the package specification window 635 presents a recommended package to the user. For example, the recommended package may be presented through the package indicator 637. The recommended package may be determined according to the inputs specified through the input specification window 630. Additionally, the package specification window 635 may allow a user to select a package other than the recommended package. Additionally, the package specification window 635 may allow a user to specify other characteristics of the package. For example, the package specification window 635 may allow a user to select a package type and a number of package pins.

In another embodiment, a pin layout window (not shown) indicates the status of a pin layout operation. The pin layout window may notify the user of the pin layout status through a pin layout indicator. The pin layout window also may show the status of a pin layout generator program, the directory location of the pin layout generator program, or other pin layout information.

Figure 13:
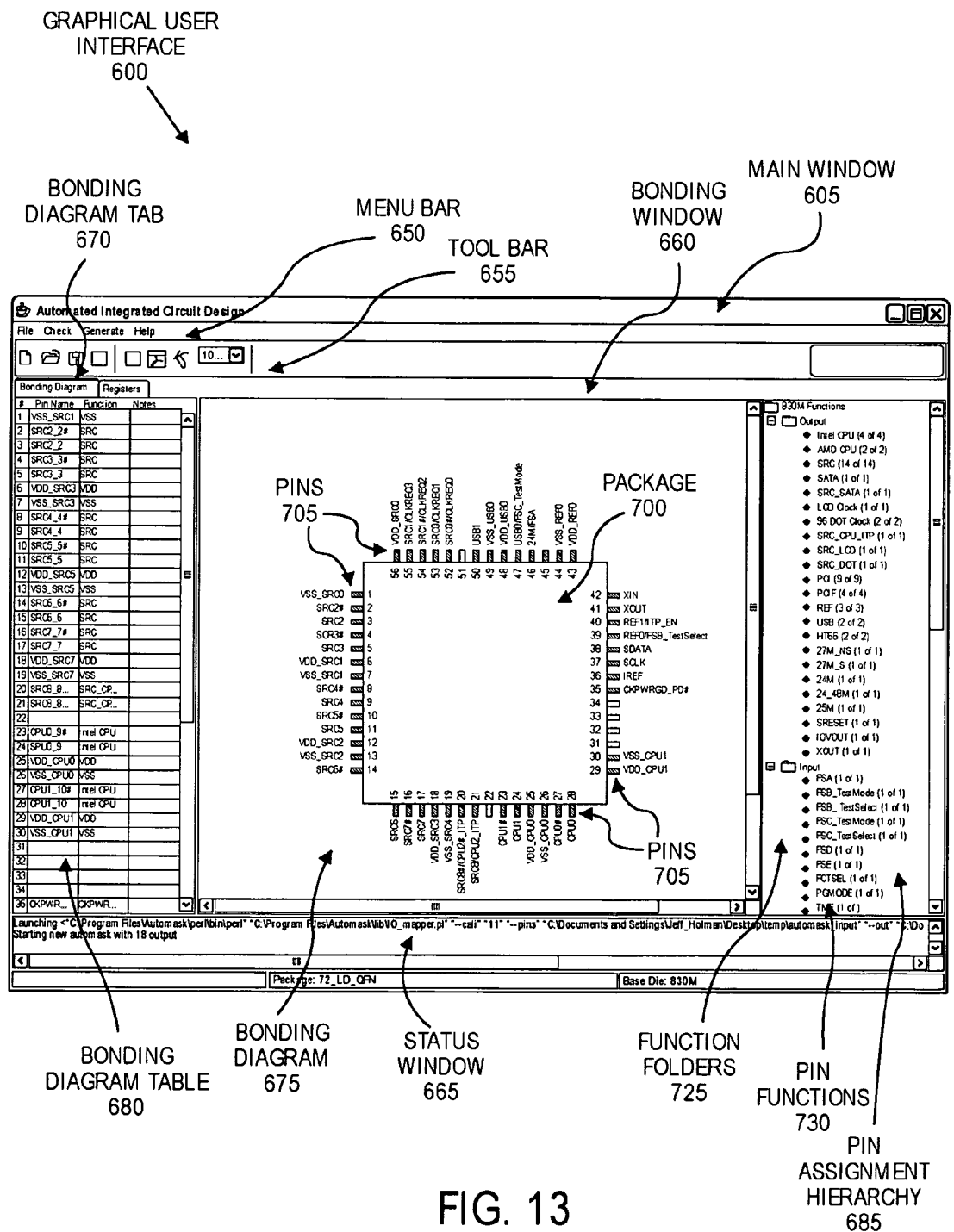
FIG. 13 illustrates another embodiment of the main window of the graphical user interface for front end automation.

FIG. 13 illustrates another embodiment of the main window 605 of the graphical user interface 600 for front end automation. The depicted main window 605 includes a menu bar 650, a tool bar 655, a bonding window 660, and a status window 665. The menu bar 650 includes typical program menu selections (e.g., drop-down menus). The menu bar 650 also may include customized menu selections for the graphical user interface 600, including menu selections to utilize one or more automation tools 20. Similarly, the tool bar 655 may include typical tool buttons, as well as customized tool buttons, corresponding to one or more of the menu selections from the menu bar 650. In one embodiment, the status window 665 shows operations that are in progress or that are completed. The status window 665 also may show the directory path for one or more programs running in conjunction with the graphical user interface 600.

In one embodiment, a user may select to display the bonding window 660 using the bonding diagram tab 670 at the top of the bonding window 660, although the bonding diagram tab 670 may be in another location of the bonding window 660. The depicted bonding window 660 includes a bonding diagram 675, a bonding diagram table 680, and a pin assignment hierarchy 685. In one embodiment, the bonding diagram 675 presents a block diagram of at least a portion of the proposed chip design. The bonding diagram 675 is described in more detail below.

The bonding diagram table 680 lists the package pins of the proposed chip design in table format. Exemplary table entries for each pin may include a pin number, a pin name, a pin function, and comments, although other embodiments may include fewer or more table entries. Unused pins may be identified by the omission of a table entry or may be identified by a label such as "unassigned" or other designation.

The pin assignment hierarchy 685 lists available input and output functions for the selected base die. The assigned and unassigned functions may be identified within the pin assignment hierarchy 685. In one embodiment, the pin assignment hierarchy 685 includes one or more pin functions 730 categorized into function folders 725. For example, the functions for the B30M base die are categorized into multiple function folders 725, including an output function folder and an input function folder. Other folders may include power functions, ground functions, and so forth. Each function folder 725 may include several types of possible pin functions 730 which may be assigned to various pins 705 within the bonding diagram 675.

The bonding diagram 675 depicts a block representation, although other representations may be used, of the selected package 700 and associated pins 705. The package 700 may be identified and graphically depicted according to actual relative dimensions of the package. In one embodiment, the pins 705 are identified by number and function. Additionally, the pins 705 may be shown in different colors to identify them as assigned or unassigned, or to identify a potential chip design issue, as discussed in more detail below. In one embodiment, the functions listed in the pin assignment hierarchy 685 may be selected and assigned to pins within the bonding diagram 675. For example, the user may drag-and-drop a pin function from the pin assignment hierarchy 685 to a selected pin 705 to assign the selected pin function to the selected pin 705. Similarly, the user may drag-and-drop a pin function from a selected pin 705 to the pin assignment hierarchy to remove a pin assignment from the selected pin 705. In a similar manner the user may drag-and-drop pin functions from one pin 705 to another pin 705 on the package 700. Pin assignments and modification may be made in other manners in addition to using a drag-and-drop technique. For example, the user may select a pin 705 and open a pin properties window (not shown) to input particular characteristics of the selected pin 705.

In one embodiment, the bonding diagram 675 may depict error pins (not shown). Error pins are pins 705 which have functions assigned to them in a manner that does not comply with a pin layout rule. For example, pins 705 may be indicated as error pins if the functions assigned to the pins 705 should be assigned to adjacent pins and the pins 705 are not adjacent to each other. In one embodiment, the error pins 710 may be identified by a unique color shown on the pins 705. Alternatively, a rule compliance window or another notification technique may be used to identify the error pins.

In another embodiment, the bonding diagram 675 may show reassignment of a pin location. The pin function may be reassigned to a new pin 705 by using a drag-and-drop technique, or may be unassigned and reassigned using the pin assignment hierarchy 685. In another embodiment, the bonding diagram 675 may show a pin status indicator (not shown). The pin status indicator indicates the status of a pin (e.g., assigned or unassigned). In other embodiments, the pin status indicator may indicate other information about the selected pin 705. A pin 705 may be selected by moving a cursor (not shown) over the pin 705, by using the cursor to select the pin 705, by using the menu functions to select the pin 705, or in another manner. In one embodiment, the bonding diagram 675 may show the selected pin 705 in a different color to indicate that the pin 705 is selected. In another embodiment, the pin status indicator may be represented in a separate window.

In another embodiment, the bonding diagram 675 may show added pins 705. The added pins 705 may result from adding functions to otherwise unassigned pins 705. The added pins 705 may be identified by color or another indicator to show, for example, a bonding status of the added pins 705. In another embodiment, the graphical user interface 600 may show a pin error indicator (not shown). The pin error indicator notifies the user of an error in a proposed pin layout. For example, if the user moves to pins apart whose functions should be adjacent according to the pin layout rules, the pin error indicator may notify the user of the rule that the pins should be adjacent to one another. Although the pin error indicator may be a separate window, other embodiments of the pin error indicator may be implemented.

Figure 14:
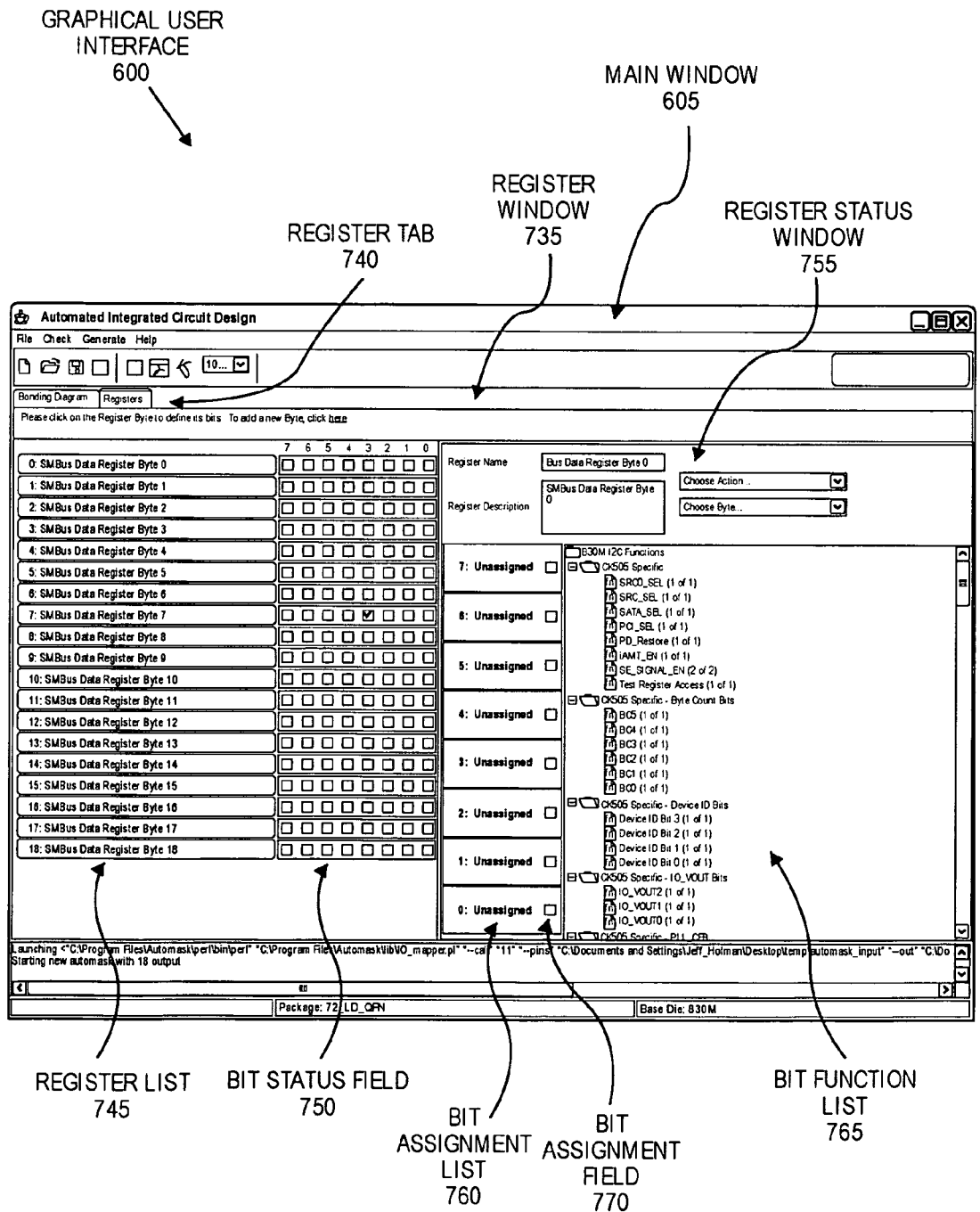
FIG. 14 illustrates one embodiment of the graphical user interface and a register window.

FIG. 14 illustrates another embodiment of the graphical user interface 600 and a register window 735. In one embodiment, a user may select to display the register window 735 using the register tab 740 at the top of the register window 735 (next to the bonding diagram tab 670), although the register tab 740 may be in another location of the register window 735. The register window 735 depicts a plurality of registers and register characteristics associated with the proposed chip design. In one embodiment, the register window 735 allows a user to see and possibly specify certain characteristics of each register. The depicted register window 735 includes a register list 745 and a corresponding plurality of bit status fields 750. The register window 735 also includes a register status window 755, a bit assignment list 760, and a bit function list 765.

In one embodiment, the register list 745 lists one or more of the register bytes and corresponding bits. A user may select a register byte from the register list 745 and use the bit assignment list 760 and bit function list 765 to assign a function to each bit within the register byte. For example, the user may select a bit assignment field 770 to assign a bit function to the selected bit. The register status window 755 displays the register name and allows the user to input comments related to the selected register byte and define characteristics associated with the selected register byte.

Figure 15:
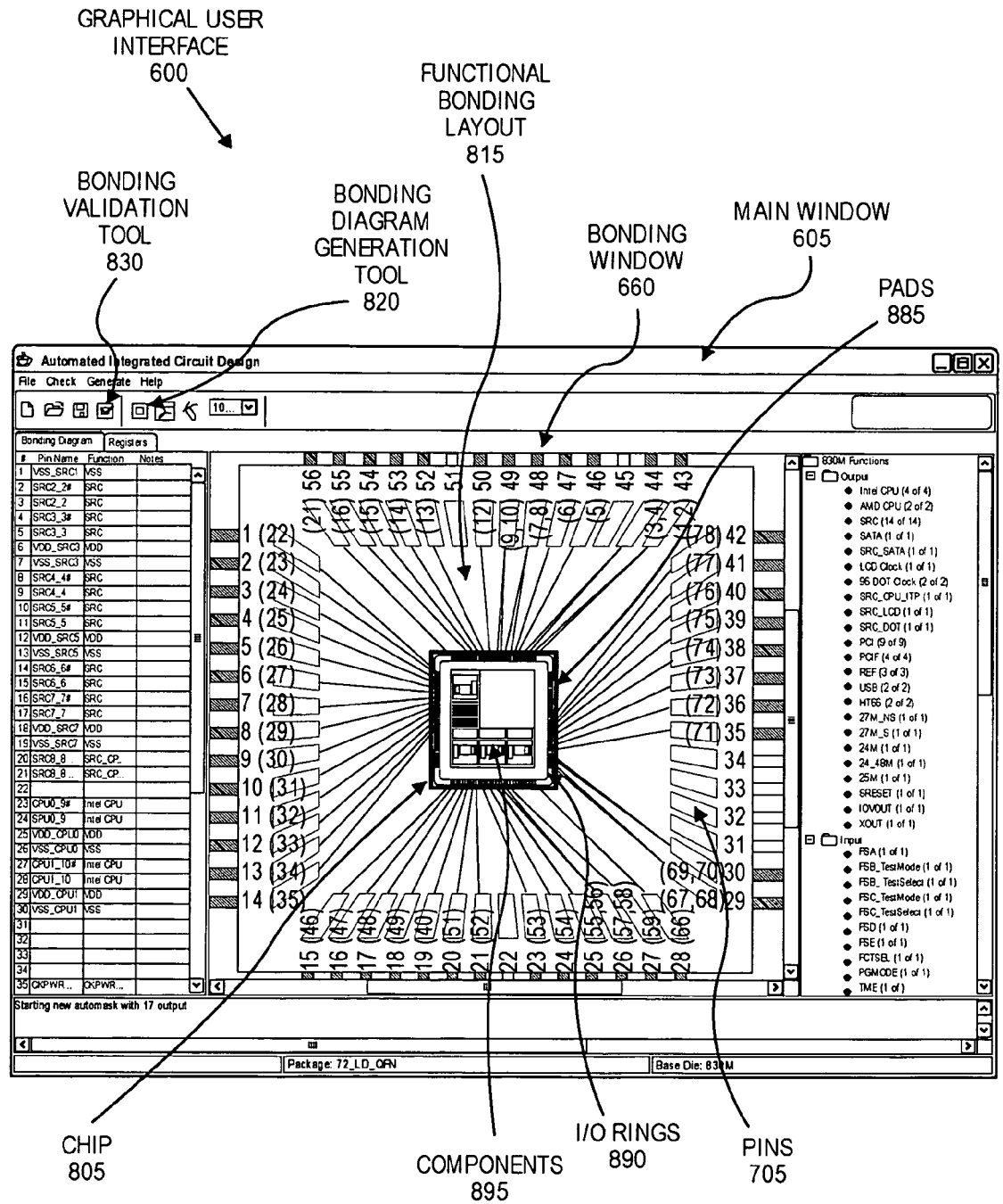
FIG. 15 illustrates one embodiment of the graphical user interface and the bonding window.

FIG. 15 illustrates another embodiment of the graphical user interface 600 and the bonding window 660. In the depicted embodiment, the block diagram within the bonding diagram 675 is enlarged (e.g., using a typical zoom function) to show the package 700 in more detail. A preliminary functional bonding layout (not shown) may be overlaid with the package 700 and pins 705 to functionally show how the individual pads 885 of the chip 805 are potentially bonded, or connected, to the individual package pins 705. In one embodiment, the preliminary functional bonding layout also may show pad designations (shown in parentheses) next to each of the package pins 705 to numerically designate the pad 885 or pads 885 connected to the corresponding pin 705. In another embodiment, the preliminary functional bonding layout may include other designations or bonding information.

Furthermore, the preliminary functional bonding layout (and other bonding layouts) may be hidden from the user, unless the user is authorized to view the preliminary functional bonding layout. In another embodiment, the user may, for example, make a selection through the graphical user interface 600 to show the preliminary function bonding layout (or another bonding layout). In another example, the field application engineer may be able to push a "secret" key or combination of keys on a keyboard to display a bonding layout to the customer.

Because the preliminary functional bonding layout may not account for all of the design characteristics of the proposed chip design, the user may generate a functional bonding layout 815 according to the proposed chip design. In particular, the I/O pads 885 of the chip 805 are functionally connected to the package pins 705. In certain embodiments, multiple I/O pads 885 may be connected to a single package pin 705. Alternatively, a single I/O pad 885 may be connected to multiple package pins 705. The depicted functional connections (shown as white lines) functionally represent the physical metal layers that may be implemented to achieve the proposed chip design. The functional bonding layout 815 may or may not be the same as the preliminary functional bonding layout 815. In one embodiment, the user may select the bonding diagram generation tool 820 to generate the functional bonding layout 815.

Subsequently, the functional bonding layout 815 may be validated. Validation refers to determining if the electrical connections portrayed in the functional bonding layout 815 actually can be implemented with the chip 805 and the package 700. In one embodiment, the user may generate a validated functional bonding layout by selecting the bonding validation tool 830. In order to validate the functional bonding layout 815, the bonding validation tool 830 may reference one or more bonding rules. If the functional bonding layout 815 cannot be validated, the graphical user interface 600 may present a validation error indicator (not shown) to the user in the form of a pop-up window or other notification event.

In another embodiment, the graphical user interface 600 also may show the I/O rings 890, and components 895 of the chip 805. The I/O rings 890 may be configured in different ways, depending on the specified functionality of the chip 805 and the pad assignment, to connect the components 895 of the chip 805 to the I/O pads 885. The components 895 may include different types of analog or digital devices. In one embodiment, the chip 805 is a clock chip and the components 895 include multiple phase-locked loop (PLL) logic blocks. However, other types of chips 805 may include other types of components 895.

Using the functional bonding diagram 815, the graphical user interface 600 may present a datasheet creation window (not shown) to create a datasheet for the proposed chip design. In one embodiment, the user may select a datasheet tool to open the datasheet creation window. The datasheet creation window may display information about the proposed chip design and allow the user to make selections regarding the chip design and the datasheet generation. In another embodiment, the datasheet may be generated in a portable document format (PDF). Alternatively, the datasheet may be generated in another document or image format accessible by the user. In one embodiment, the datasheet includes data about the package parasitics and other design information of the proposed chip design.

The graphical user interface 600 also may present a modeling window (not shown) to the user to create a modeling report for the proposed chip design. In one embodiment, the user may select a modeling tool to open the modeling window. The modeling window may display information about the proposed chip design and allow the user to make selections regarding the chip design and the model generation. For example, the user may input a part number for which modeling information is to be generated or presented to the user. The modeling report may be in a portable document format (PDF) or another document or image format accessible by the user. In one embodiment, the modeling report includes I/O buffer information specification (IBIS) data, although other embodiments may include other information.

The graphical user interface 600 also may present a new sales window (not shown) to the user to generate a new sales opportunity form. In one embodiment, the user may open the new sales window using a button on the toolbar 655 or a menu selection from the menu bar 650. The new sales window allows a user to input information about the proposed chip design, the customer, and other data related to the chip design project. The new sales window also may allow the user to specify and directly send new sales opportunity or order information to another person such as an account manager.

Figure 16:
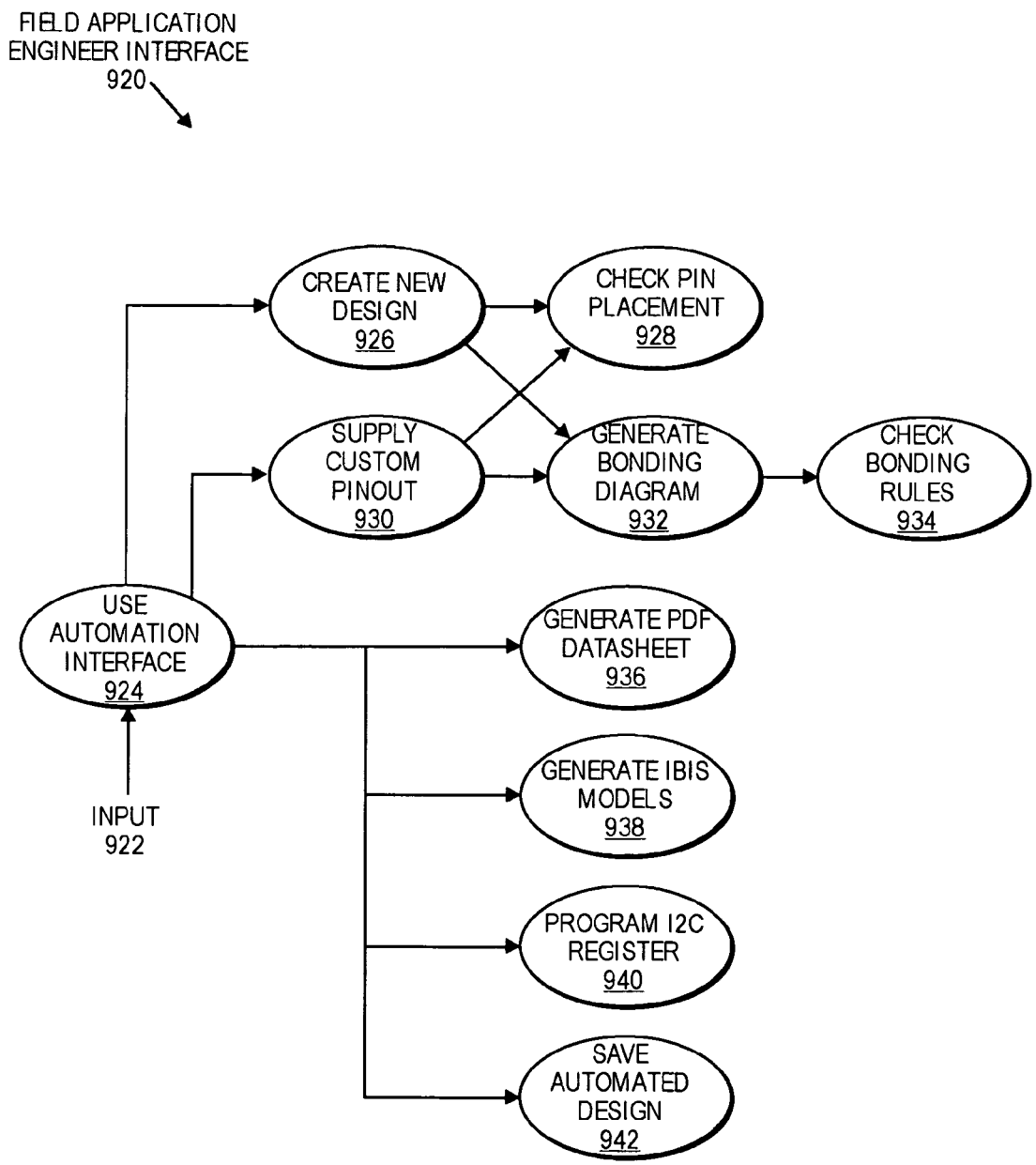
FIG. 16 illustrates one embodiment of a field application engineer interface process for the automated chip design process.

FIG. 16 illustrates one embodiment of a field application engineer interface process 920 for the automated chip design process 10. Although the depicted field application engineer interface process 920 shows one manner in which a field application engineer may interface with the front end system 200 and back end system 300 described above, other interface operations may be implemented in place of or in addition to the field application engineer interface process 920 described herein.

In one embodiment, the field application engineer provides input 922 to use the automation interface 924. Through the automation interface, the field application engineer creates a new automated design 926 for the proposed chip design and checks the pin placement, or layout, rules 928 to verify that the new automated design complies with the pin layout rules. Alternatively, the customer may supply a custom pin layout 930 to the automation interface and check the pin placement, or layout, rules 925 to verify that the custom design complies with the pin layout rules. The field application engineer also generates a bonding diagram 932 using the new automated design, or the custom design, and checks the bonding rules 934 to validate the proposed chip design.

The field application engineer then uses the automation interface 924 to generate one or more outputs related to the proposed chip design. For example, the field application engineer may generate a PDF datasheet 936 and IBIS models 938. Additionally, the field application engineer may program the I2C buffer registers 940 and save the automated design 942 for future reference. In another embodiment, the field application engineer also may use the automation interface 924 to perform any of the operations described herein, or other operations related to the development of the proposed chip design.

Figure 17:
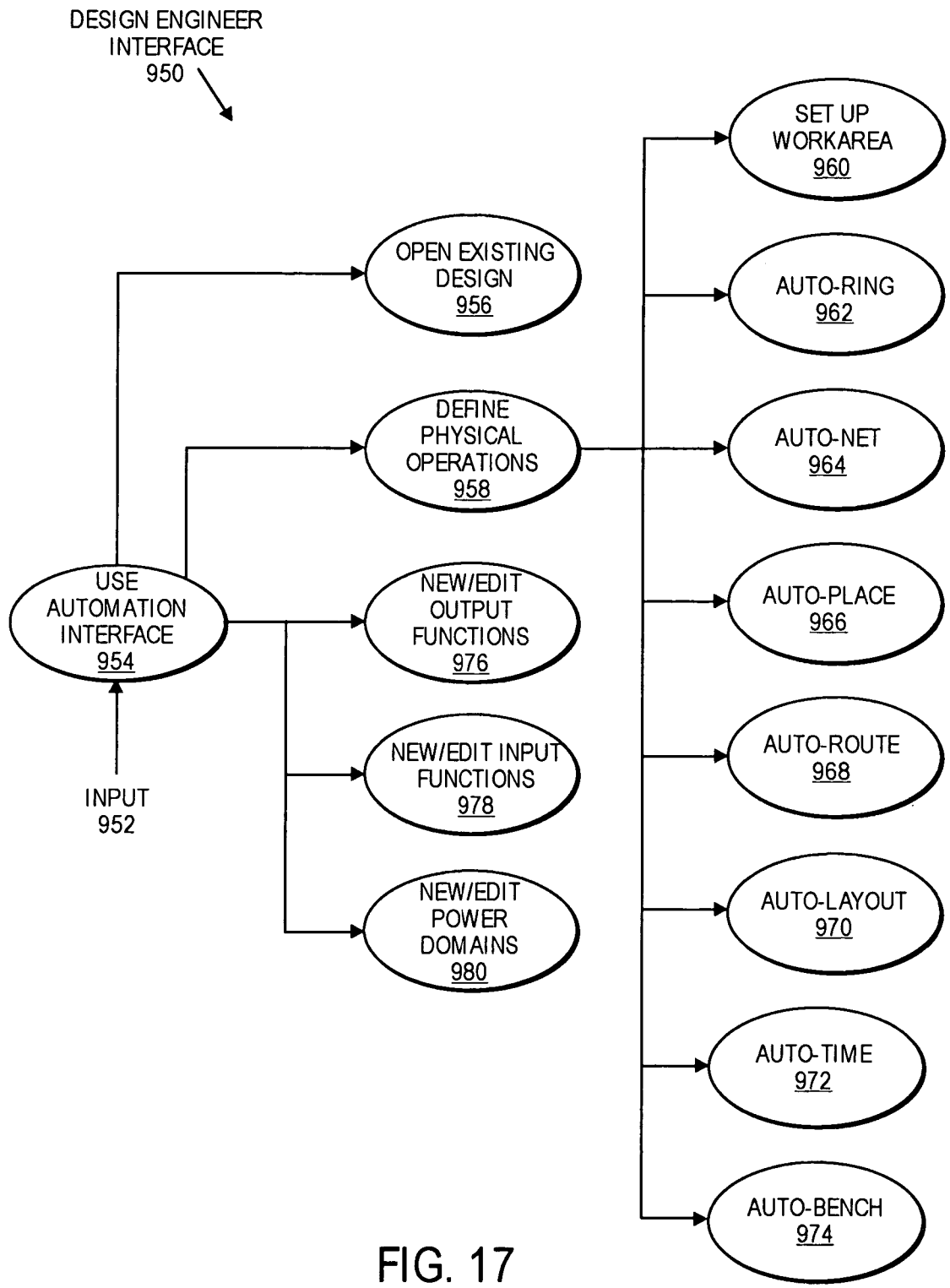
FIG. 17 illustrates one embodiment of a design engineer interface process for the automated chip design process.

FIG. 17 illustrates one embodiment of a design engineer interface process 950 for the automated chip design process 10. Although the depicted design engineer interface process 950 shows one manner in which a design engineer may interface with the front end system 200 and back end system 300 described above, other interface operations may be implemented in place of or in addition to the design engineer interface process 950 described herein.

In one embodiment, the design engineer provides input 952 to use the automation interface 954. Through the automation interface, the design engineer opens a saved design 956 for the proposed chip design. The design engineer then defines physical operations 958 of the proposed chip design. Defining the physical operations 958 may include setting up a workarea 960, automatically defining I/O rings 962, automatically generating a netlist 964, automatically placing components on the chip 966, automatically routing metal layers on the chip 968, automatically laying out components on the chip 970, automatically analyzing the timing of the chip 972, and automatically generating a test bench 974 for the proposed chip design. Other embodiments may include defining other physical operations 958.

Additionally, the design engineer may create new and/or edit existing output functions 976 of the proposed chip design. The design engineer also may create new and/or edit existing input functions 978 of the proposed chip design. Furthermore, the design engineer may create new and/or edit existing power domains 980 of the proposed chip design. In another embodiment, the design engineer also may use the automation interface 954 to perform any of the operations described herein, or other operations related to the development of the proposed chip design.

Figure 18:
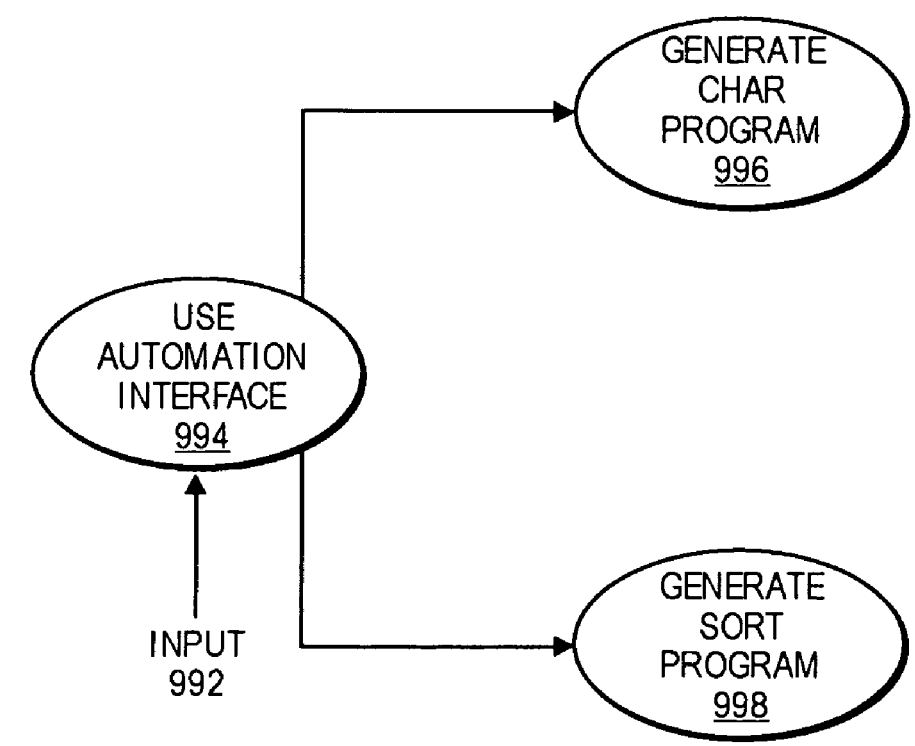
FIG. 18 illustrates one embodiment of a product-test engineer interface process for the automated chip design process.

FIG. 18 illustrates one embodiment of a product-test engineer interface process 990 for the automated chip design process 10. Although the depicted product-test engineer interface process 990 shows one manner in which a product-test engineer may interface with the front end system 200 and back end system 300 described above, other interface operations may be implemented in place of or in addition to the product-test engineer interface process 990 described herein.

In one embodiment, the product-test engineer provides input 992 to use the automation interface 994. In another embodiment, the product-test engineer uses the automation interface 994 to open a saved design for the proposed chip design. The product-test engineer then uses the automation interface 994 to generate a characterization program 996 for the proposed chip design. The product-test engineer also may use the automation interface 994 to generate a sorting program 998 for the proposed chip design. In another embodiment, the product-test engineer also may use the automation interface 994 to perform any of the operations described herein, or other operations related to the development of the proposed chip design.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing device(s) described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing device(s) and special-purpose processing device(s).

Embodiments of the present invention include various operations, which have been described above. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method, comprising:
   receiving a customer specification for a custom integrated circuit at a processing device, wherein the customer specification comprises one or more integrated circuit parameters, wherein the one or more integrated circuit parameters comprises a package input parameter and a package output parameter; and
   developing the custom integrated circuit based on the customer specification using a software tool which integrates a plurality of integrated circuit development operations, wherein the software tool operates on the processing device, wherein the plurality of integrated circuit development operations comprises front end operations and back end operations, the method further comprising performing the front end operations by the software tool while operating at a customer site, and wherein the front end operations comprises:
      selecting a package for the custom integrated circuit based on the package input parameter;
      selecting a pin layout for the selected package;
      selecting a base die for the custom integrated circuit based on the package output parameter, wherein the base die comprises components and circuitry to perform electronic functions;
      selecting a pad assignment for the selected base die, wherein the pad assignment comprises a plurality of bonding pads that make electrical connection to a plurality of package pins of the package; and
      generating an initial pin-to-pad mapping of the electrical connections between the plurality of bonding pads and the plurality of package pins of the package.

2. The method of claim 1, wherein the custom integrated circuit comprises a clock circuit.

3. The method of claim 1, wherein developing the custom integrated circuit comprises selecting one of a plurality of predetermined functions of the custom integrated circuit by altering integrated circuit design data corresponding to a metal mask layer used to fabricate the custom integrated circuit.

4. The method of claim 3, wherein the integrated circuit design data comprises a netlist.

5. The method of claim 1, wherein developing the custom integrated circuit comprises customizing a standard integrated circuit design to generate the custom integrated circuit by altering integrated circuit design data corresponding to a metal mask layer used to fabricate the custom integrated circuit.

6. The method of claim 5, wherein the integrated circuit design data comprises a netlist.

7. The method of claim 6, wherein the netlist is expressed as a graphical design system II (GDSII) file.

8. The method of claim 1, further comprising fabricating a commercial unit of the custom integrated circuit, wherein one of the plurality of integrated circuit development operations comprises generation of a datasheet specification, wherein the commercial unit matches the datasheet specification.

9. The method of claim 1, further comprising performing the back end operations at a site other than the customer site.

10. The method of claim 1, wherein the initial pin-to-pad mapping is an bonding diagram which graphically represents the electrical connections between the plurality of bonding pads and the plurality of package pins of the package.

11. The method of claim 1 wherein the front end operation further comprise:
   generating a datasheet for the custom integrated circuit; and
   generating an input/output (I/O) buffer information specification (IBIS) model.

12. A computer-implemented method, comprising:
   receiving a customer specification for a custom integrated circuit at a processing device, wherein the customer specification comprises one or more integrated circuit parameters, wherein the one or more integrated circuit parameters comprises a package input parameter and a package output parameter; and
   developing the custom integrated circuit based on the customer specification using a software tool which integrates a plurality of integrated circuit development operations, wherein the software tool operates on the processing device, wherein the plurality of integrated circuit development operations comprises front end operations and back enc operations, the method further comprising performing the front end operations by the software tool while operating at a customer site, and wherein the front end operations comprises selecting a base die for the custom integrated circuit based on the package output parameter, wherein the base die comprises components and circuitry to perform electronic functions.

13. The method of claim 12, wherein the front end operations further comprise generating a datasheet for the custom integrated circuit.

* * * * *